United States Patent
Miyajima et al.

(10) Patent No.: US 6,813,049 B2
(45) Date of Patent: Nov. 2, 2004

(54) TORSIONAL ROCKING STRUCTURAL COMPONENT

(75) Inventors: Hiroshi Miyajima, Hachioji (JP); Toshiharu Hidaka, Hachioji (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 10/440,680

(22) Filed: May 19, 2003

(65) Prior Publication Data

US 2003/0218787 A1 Nov. 27, 2003

Related U.S. Application Data

(63) Continuation of application No. 09/897,244, filed on Jul. 2, 2001, now abandoned.

(30) Foreign Application Priority Data

Jul. 10, 2000 (JP) ........................................ 2000-208999

(51) Int. Cl.$^7$ .............................................. G02B 26/08
(52) U.S. Cl. ....................................... 359/199; 359/223
(58) Field of Search .................................. 359/198, 199, 359/223, 224, 871, 872

(56) References Cited

U.S. PATENT DOCUMENTS

| | | | |
|---|---|---|---|
| 4,421,381 A | | 12/1983 | Ueda et al. |
| 5,606,447 A | | 2/1997 | Asada et al. |
| 5,629,790 A | | 5/1997 | Neukermans et al. |
| 6,122,089 A | | 9/2000 | Minamoto et al. |
| 6,188,504 B1 | * | 2/2001 | Murakami et al. .......... 359/224 |

* cited by examiner

Primary Examiner—Euncha P. Cherry
(74) Attorney, Agent, or Firm—Scully, Scott, Murphy & Presser

(57) ABSTRACT

There is disclosed a torsional rocking structural component comprising: a movable plate; an elastic member for rockably supporting the movable plate, the elastic member having a rectangular parallelepiped shape, and a rectangular surface; a support for holding the elastic member; and a wiring passing through the elastic member, disposed in the vicinity of a surface of the elastic member and passing through a portion in which a stress generated during torsional deformation of the elastic member is small.

12 Claims, 25 Drawing Sheets

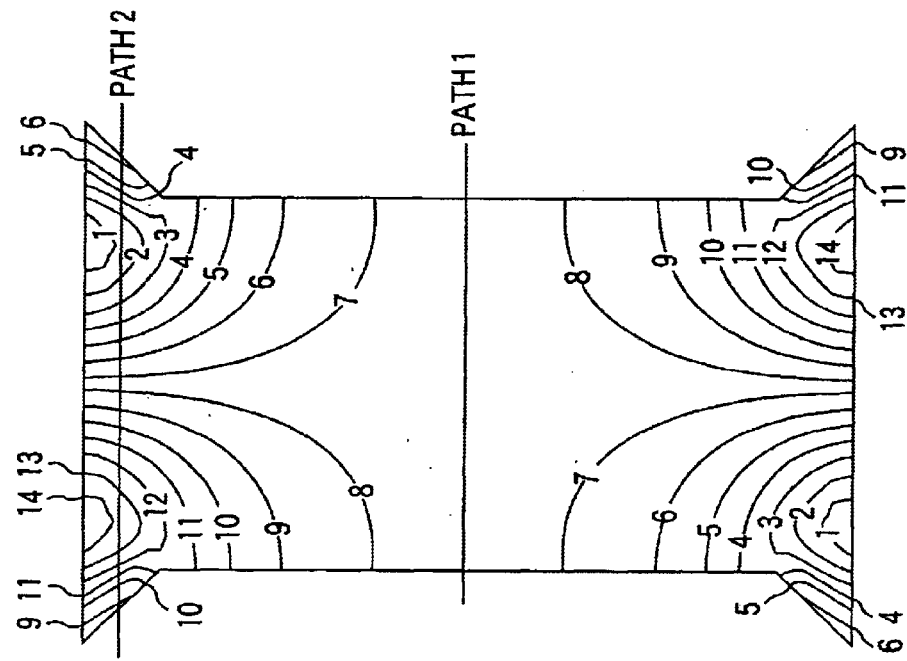
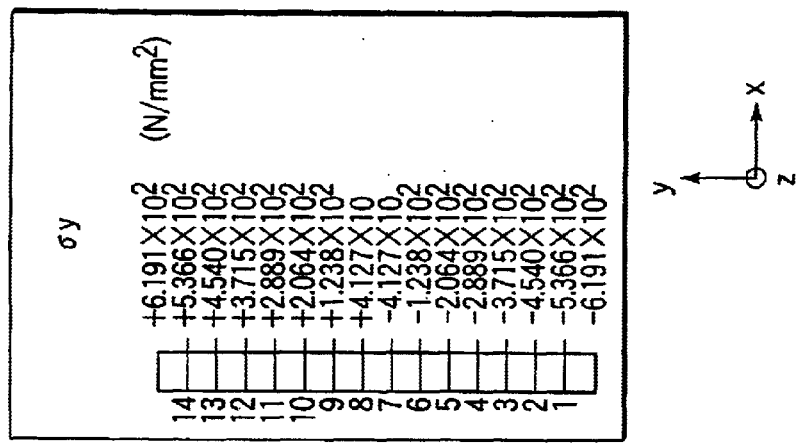
F I G. 6

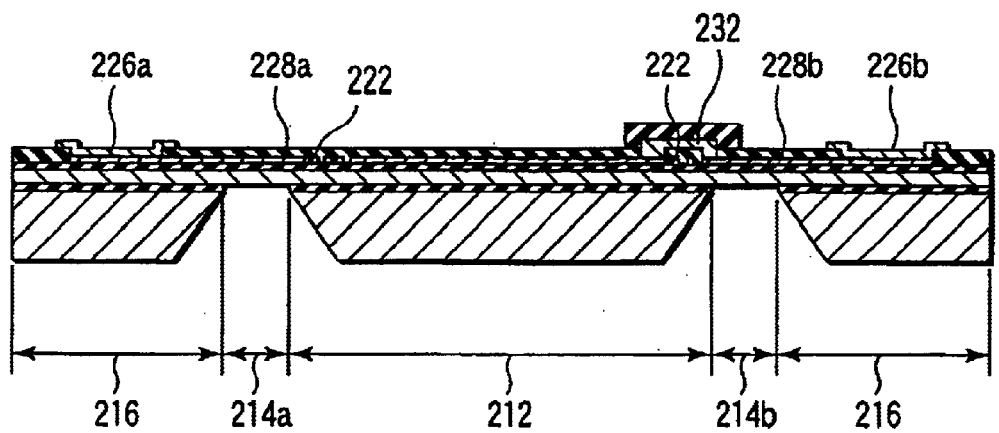
F I G. 18
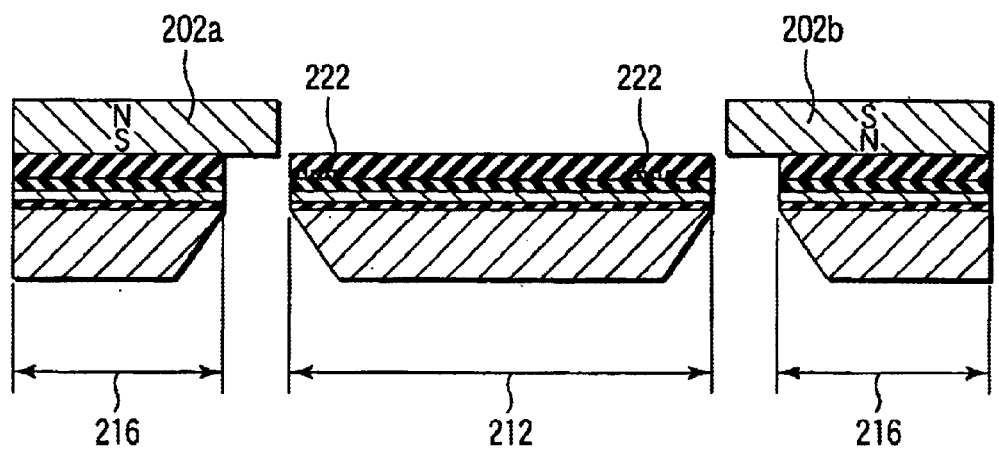
F I G. 19

TORSIONAL ROCKING STRUCTURAL COMPONENT

CROSS-REFERENCE TO RELATED APPLICATIONS

This application is based upon and claims the benefit of priority from the prior Japanese Patent Application No. 2000-208999, filed Jul. 10, 2000, the entire contents of which are incorporated herein by reference. This application is a continuation application of U.S. application Ser. No. 09/897,244 filed on Jul. 2, 2001, now abandoned, the entire contents of which is incorporated herein by its reference.

BACKGROUND OF THE INVENTION

The present invention relates to a torsional rocking structural component for use in an optical scanner, angular acceleration sensor, and the like.

A torsional rocking structural component is a structure in which a movable member is supported by a torsion spring structure. Examples of a device using the torsional rocking structural component include an optical scanner manufactured by a semiconductor process.

U.S. Pat. No. 5,606,447 titled "PLANAR TYPE MIRROR GALVANOMETER AND METHOD OF MANUFACTURE" issued to Asada et al. on Feb. 25, 1997 discloses an electromagnetic driving actuator in which a torsional rocking structural component is used. As shown in FIGS. 36 and 37, an actuator 1 is provided with a flat movable plate 5, two torsion bars 6a, 6b for rockably supporting the movable plate 5, and a frame 2 for holding the torsion bars 6a, 6b, and these members are integrally formed from a silicon substrate. The movable plate 5 includes: a flat coil 7, disposed on an upper surface peripheral edge of the plate, for generating a magnetic field from a power supply; and a total reflection mirror 8 disposed on an upper surface middle portion of the plate surrounded by the flat coil 7.

As shown in FIG. 37, upper and lower glass substrates 3 and 4 are disposed on upper and lower surfaces of the frame 2, and permanent magnets 10a, 11a and 10b, 11b for exerting a magnetic field onto the flat coil 7 are fixed at predetermined positions of the upper and lower glass substrates 3 and 4.

Furthermore, as shown in FIG. 36, the frame 2 is provided with a pair of electrode terminals 9a, 9b disposed on the upper surface of the frame, and the electrode terminals 9a, 9b are electrically connected to the flat coil 7 via coil wirings 12a, 12b extending along the respective upper surfaces of the torsion bars 6a, 6b. The flat coil 7, electrode terminals 9a, 9b and coil wirings 12a, 12b are simultaneously formed on the silicon substrate by an electroforming method.

As compared with a conventional actuator, the electromagnetic actuator can be remarkably thinned.

In general, in the torsional rocking structural component disclosed in U.S. Pat. No. 5,606,447, a stress acts on the wiring due to a torsional movement. In this case, the wiring resistance changes, and in a worst case the wiring is sometimes disconnected by metal fatigue.

BRIEF SUMMARY OF THE INVENTION

The present invention has been developed to solve the problem, and an object thereof is to provide a torsional rocking structural component in which the influence of stress generated by repeated torsional movements is reduced.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 6 shows a distribution of a normal stress $\sigma y$ obtained by simulation in which the finite element method is used with respect to the torsional deformation under the same conditions as that of analysis in FIGS. 3 and 4 with contour lines.

FIG. 18 is a sectional view of the torsional rocking structural component taken along line XVIII—XVIII of FIG. 17.

FIG. 19 is a sectional view taken along line XIX—XIX of the torsional rocking structural component shown in FIG. 17.

DETAILED DESCRIPTION OF THE INVENTION

Preferred embodiments of the present invention will be described hereinafter with reference to the drawings.

Figure 1:
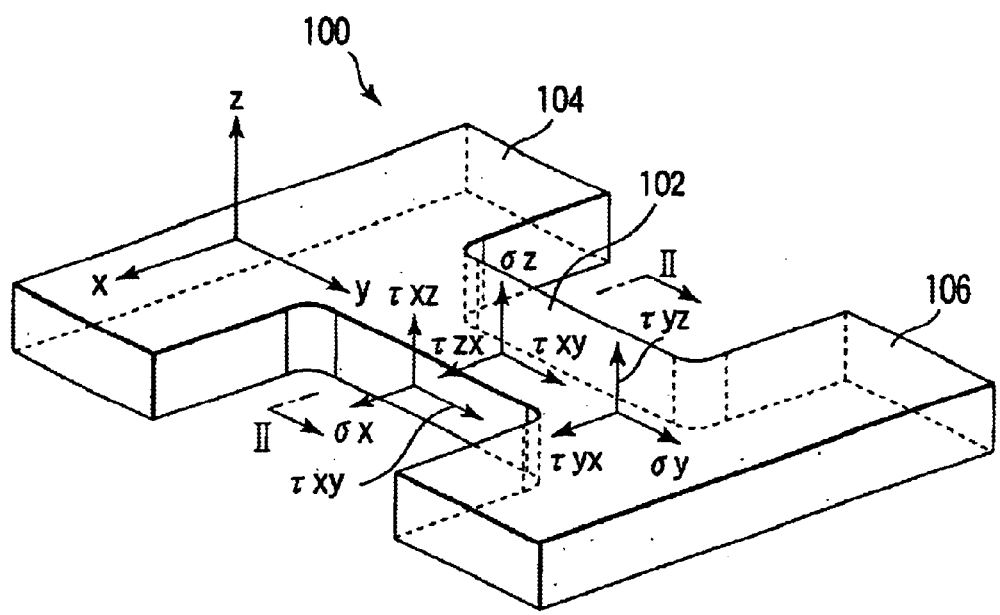
FIG. 1 is a perspective view of a model of a torsion spring structure designed to analyze the stress distribution generated in a torsion spring during torsional deformation.

Prior to the description of the embodiments, a stress distribution generated in a torsion spring during torsional deformation will first be described. Here, a model of a torsion spring structure 100 shown in FIG. 1 is considered. As shown in FIG. 1, the torsion spring structure 100 comprises a torsion spring 102, a support 104 connected to one end of the torsion spring 102, and a movable plate 106 connected to the other end of the torsion spring 102. The movable plate 106 is supported by the torsion spring 102 so as to be allowed to rock with respect to the support 104 about a rocking axis, which extends through the torsion spring 102.

In the following consideration, the torsion spring 102 has a substantially rectangular parallelepiped shape. That is, the torsion spring 102 has a uniform rectangular section along the rocking axis, excluding both ends, that is, vicinities of connection portions with the support 104 and movable plate 106. Moreover, the stress generated in the torsion spring 102 by torsional deformation is within the elastic limit of a material of the torsion spring 102, and the material of the torsion spring 102 acts isotropically when deformed.

For the torsion spring 102 shown in FIG. 1, in a middle portion of the torsion spring 102, excluding the vicinities of the connection portions with the support 104 and movable plate 106, an influence of opposite-end restricted connection portions of the torsion spring may be ignored, and a stress distribution can be derived from the Saint-Venant torsion theory based on elasticity.

Figure 2:
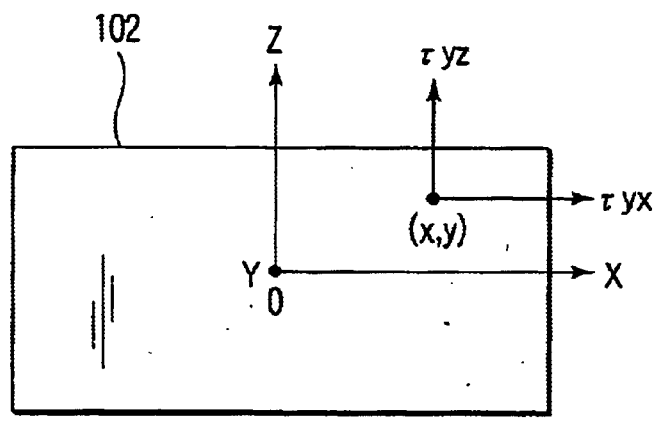
FIG. 2 is a sectional view of the torsion spring taken along line II—II of FIG. 1.

When respective stress components generated in the torsion spring 102 are defined as shown in FIGS. 1 and 2, according to the Saint-Venant torsion theory, among normal stresses $\sigma x$, $\sigma y$, $\sigma z$ and shear stresses $\tau xy$ (=$\tau yx$), $\tau xz$ (=$\tau zx$), $\tau yz$ (=$\tau zy$), stress components $\sigma x$, $\sigma y$, $\sigma z$, $\tau xz$ are zero.

Figure 3:
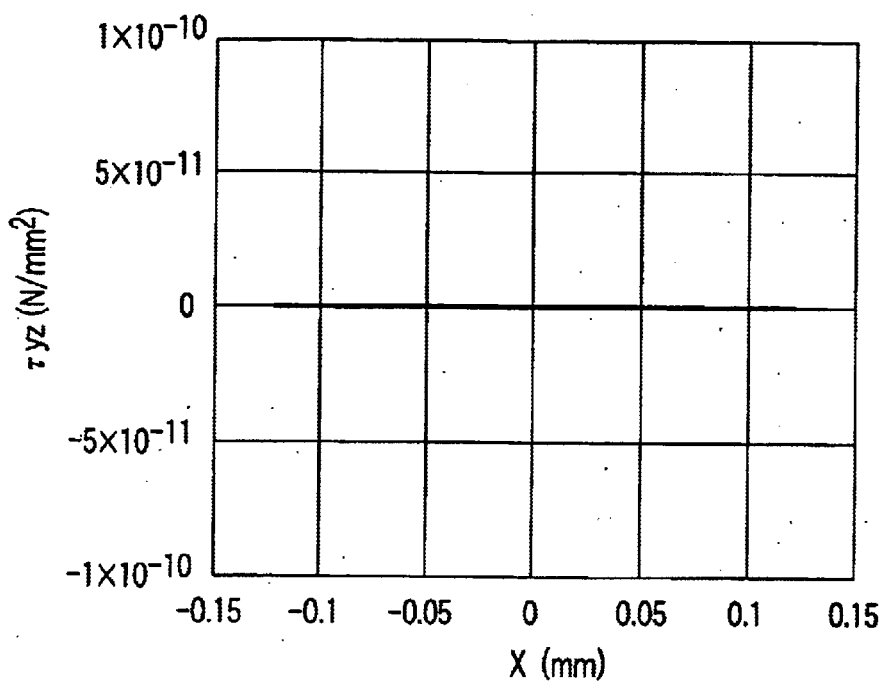
FIG. 3 shows a distribution of a shear stress $\tau yz$ solved by applying a torsion function derived from the Saint-Venant torsion theory to the torsion spring having a rectangular sectional shape.
Figure 4:
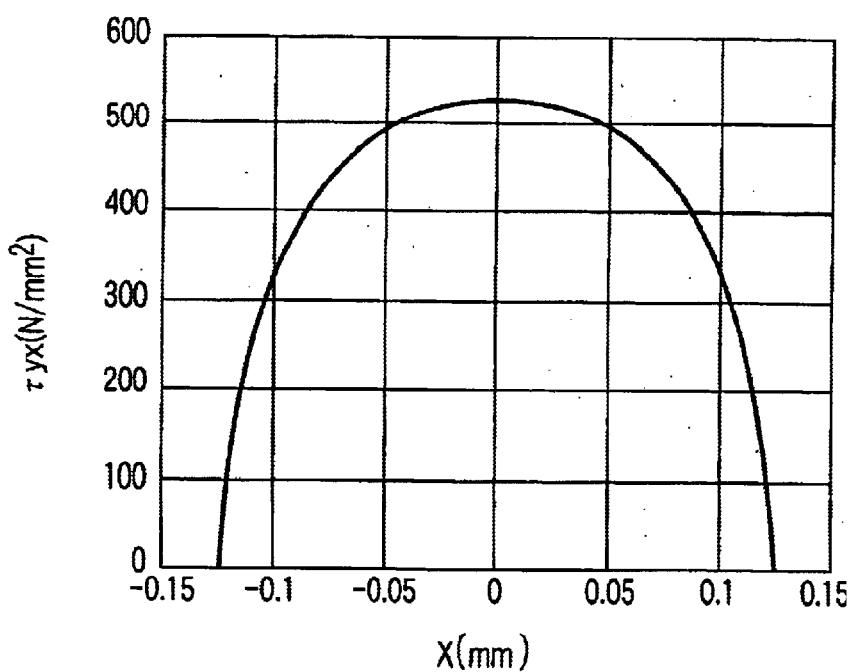
FIG. 4 shows a distribution of a shear stress $\tau yx$ solved by applying the torsion function derived from the Saint-Venant torsion theory to the torsion spring having the rectangular sectional shape.

Furthermore, with respect to the shear stress $\tau yz$, FIG. 3 shows a result obtained by applying a torsion function derived from the Saint-Venant torsion theory to a rectangular sectional shape of the torsion spring and solving the function. This shear stress $\tau yz$ is substantially zero in the vicinity of the upper surface of FIG. 2. On the other hand, also for the shear stress $\tau yx$, similar to $\tau yz$, when the torsion function is applied to the rectangular sectional shape and solved, a stress distribution shown in FIG. 4 is obtained. The stress distribution has a maximum value on a Z-axis of the rectangular section in the vicinity of the upper surface of FIG. 2, and is symmetrical with respect to the Z-axis.

Figure 5:
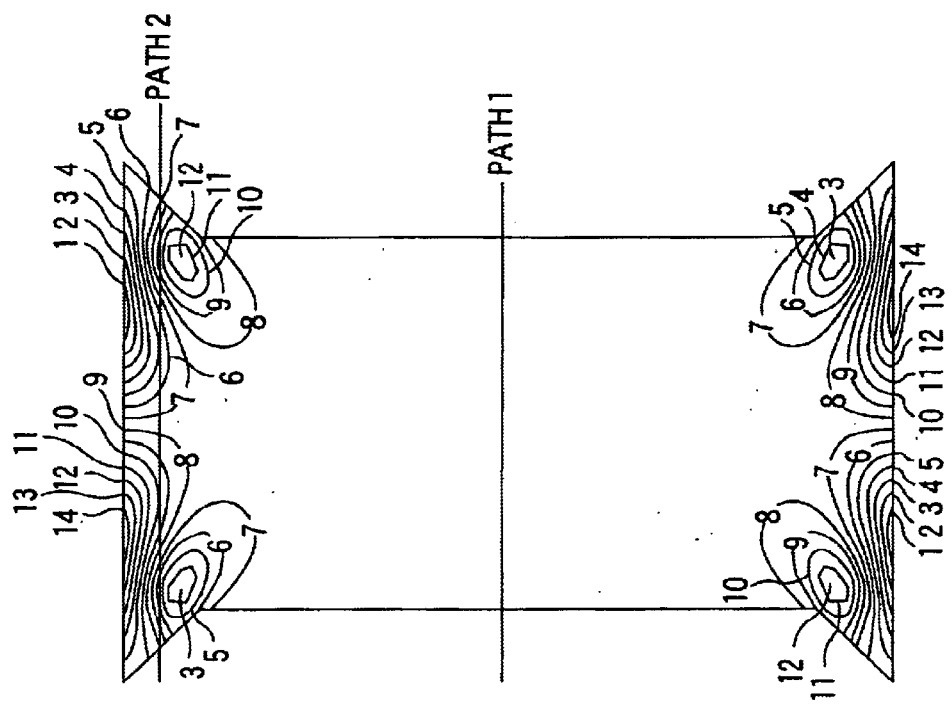
FIG. 5 shows a distribution of a normal stress $\sigma x$ obtained by simulation in which a finite element method is used with respect to the torsional deformation under the same conditions as that of analysis in FIGS. 3 and 4 with contour lines.
Figure 5:
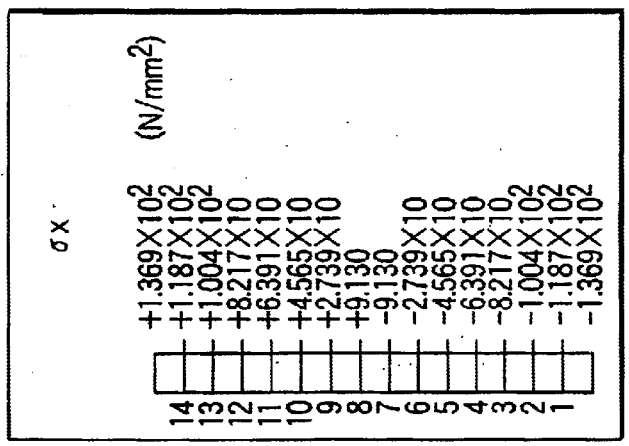
Figure 7:
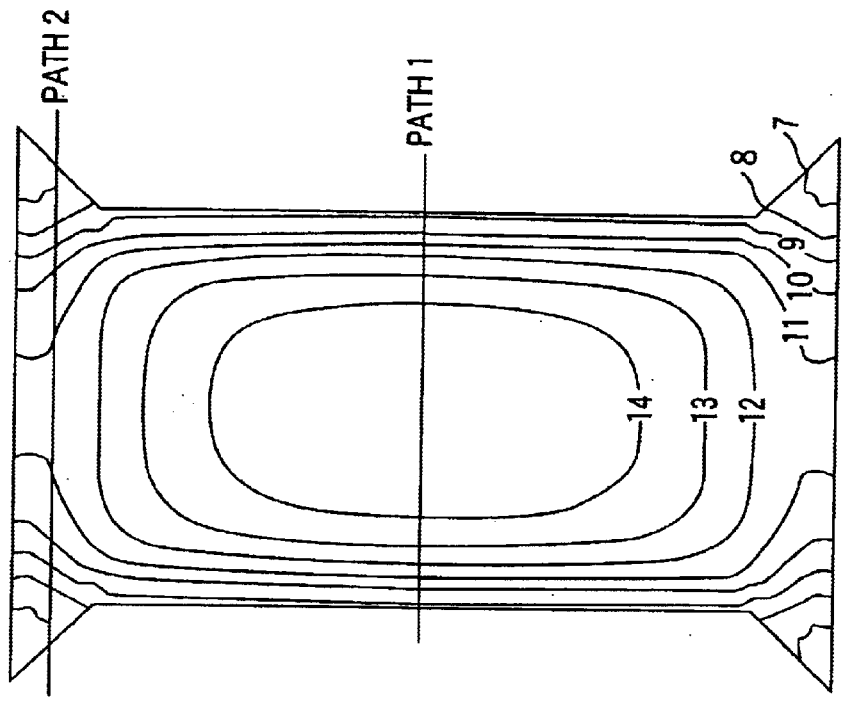
FIG. 7 shows a distribution of a shear stress $\tau yx$ obtained by simulation in which the finite element method is used with respect to the torsional deformation under the same conditions as that of analysis in FIGS. 3 and 4 with contour lines.
Figure 7:
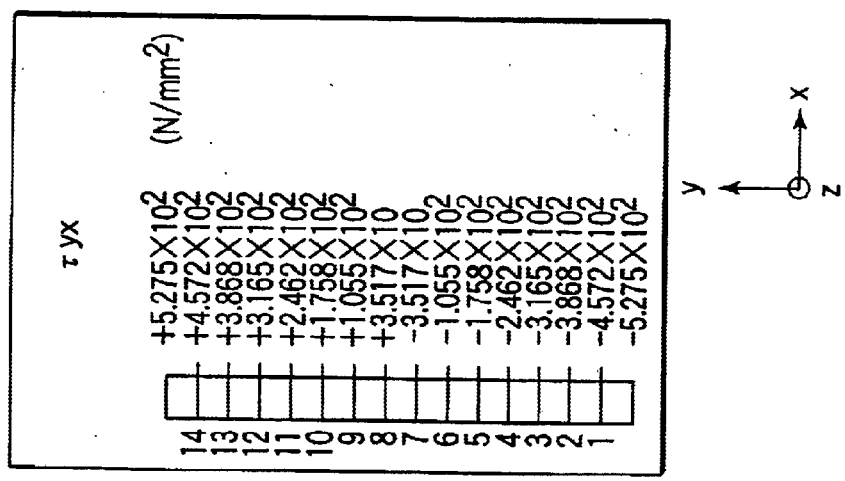
Figure 8:
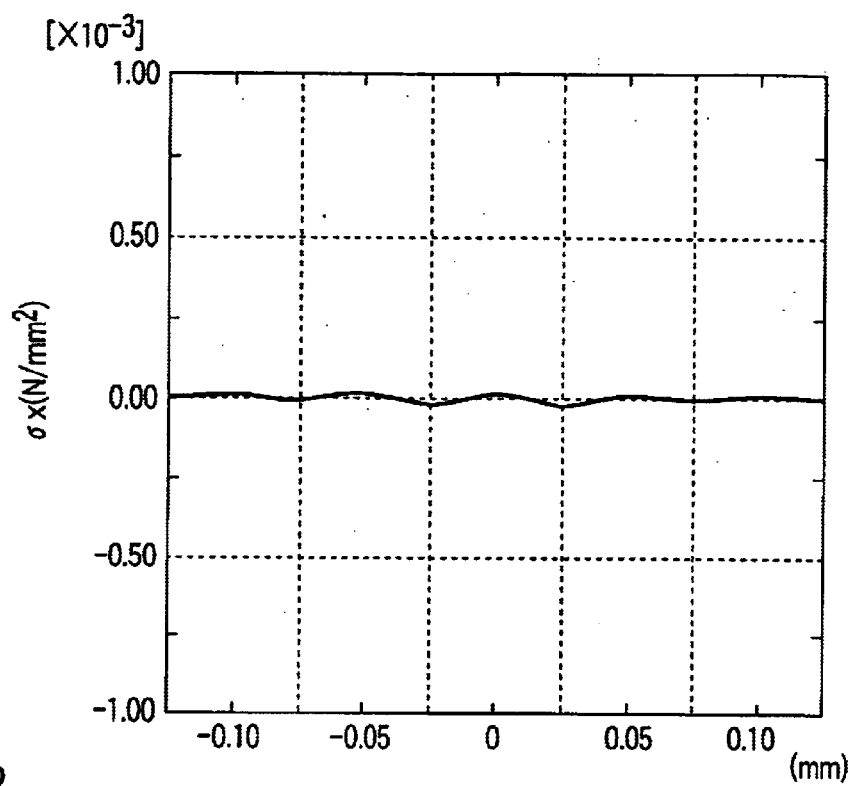
FIG. 8 shows a distribution of the stress $\sigma x$ shown in FIG. 5 along a path 1 passing through a middle portion of the torsion spring along a longitudinal axis.
Figure 9:
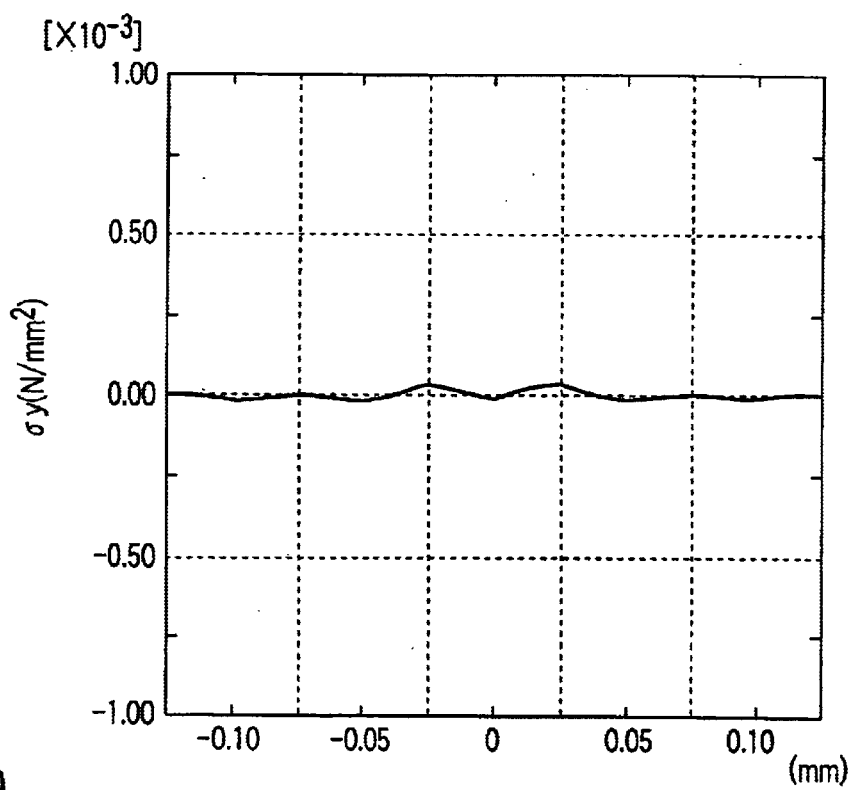
FIG. 9 shows a distribution of the stress $\sigma y$ shown in FIG. 6 along the path 1 passing through the middle portion of the torsion spring along the longitudinal axis.
Figure 10:
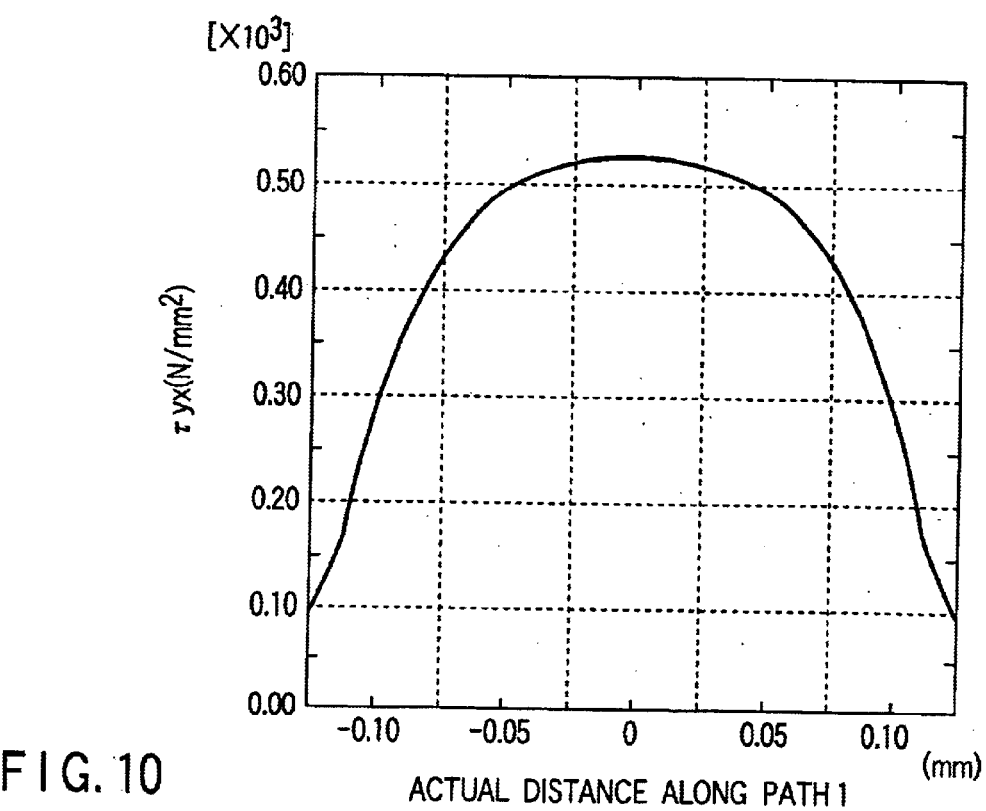
FIG. 10 shows a distribution of the stress $\tau yx$ shown in FIG. 7 along the path 1 passing through the middle portion of the torsion spring along the longitudinal axis.

FIGS. 5 to 10 show simulation results in which a finite element method is used with respect to the stress distribution generated by similar torsional deformation. FIGS. 5 to 7 show the stresses σx, σy, τyx generated in the vicinity of the upper surface of the torsion spring 102 during the torsional deformation with contour lines. Moreover, FIGS. 8 to 10 show a stress component distribution along a path 1 passing through a middle portion of the torsion spring 102 as for a longitudinal axis in the stresses σx, σy, τyx of FIGS. 5 to 7.

Comparison of these results with the results obtained by the Saint-Venant torsion theory proves that the respective stress components of the middle portion of the torsion spring 102 follow the stress distribution estimated from the torsion theory. Additionally, since a stress component becomes negative on reversing the torsion angle, an absolute value of the stress has to be evaluated. Moreover, by reversing the torsion angle, the stress generated on the upper surface is similarly generated also on the lower surface of the torsion spring 102.

Figure 11:
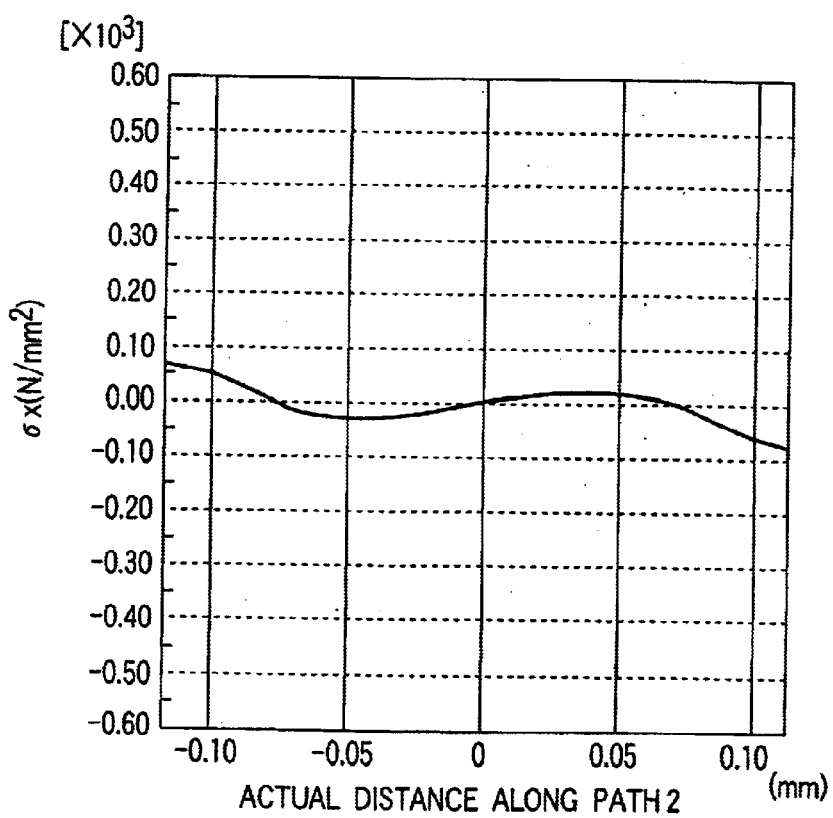
FIG. 11 shows a distribution of the stress $\sigma x$ shown in FIG. 5 along a path 2 passing in the vicinity of an end of the torsion spring.
Figure 12:
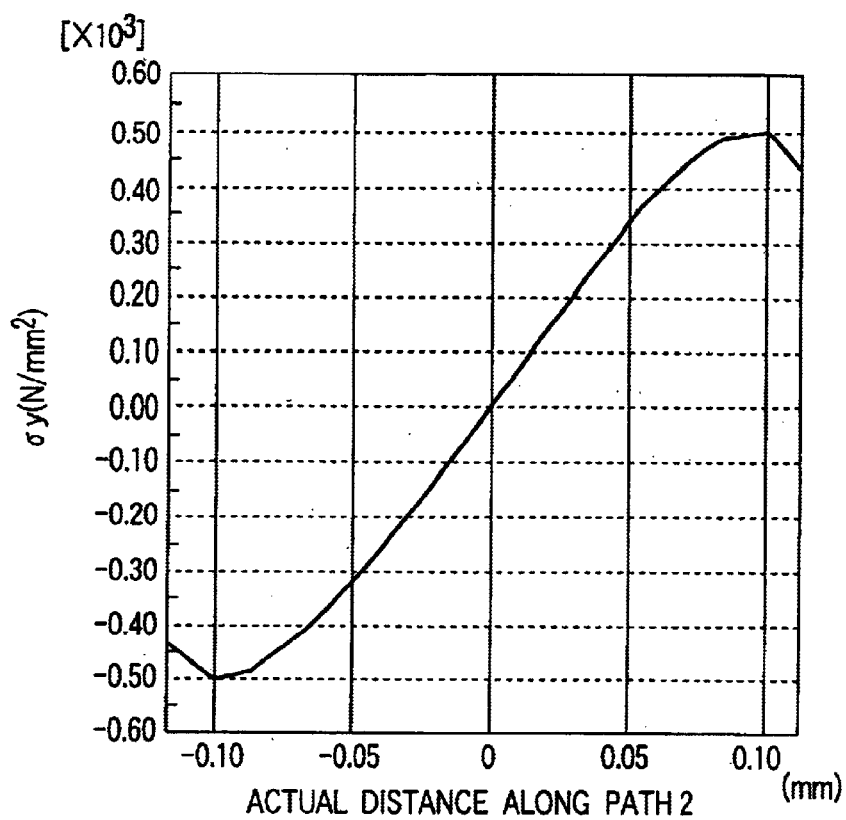
FIG. 12 shows a distribution of the stress $\sigma y$ shown in FIG. 6 along the path 2 passing in the vicinity of the end of the torsion spring.
Figure 13:
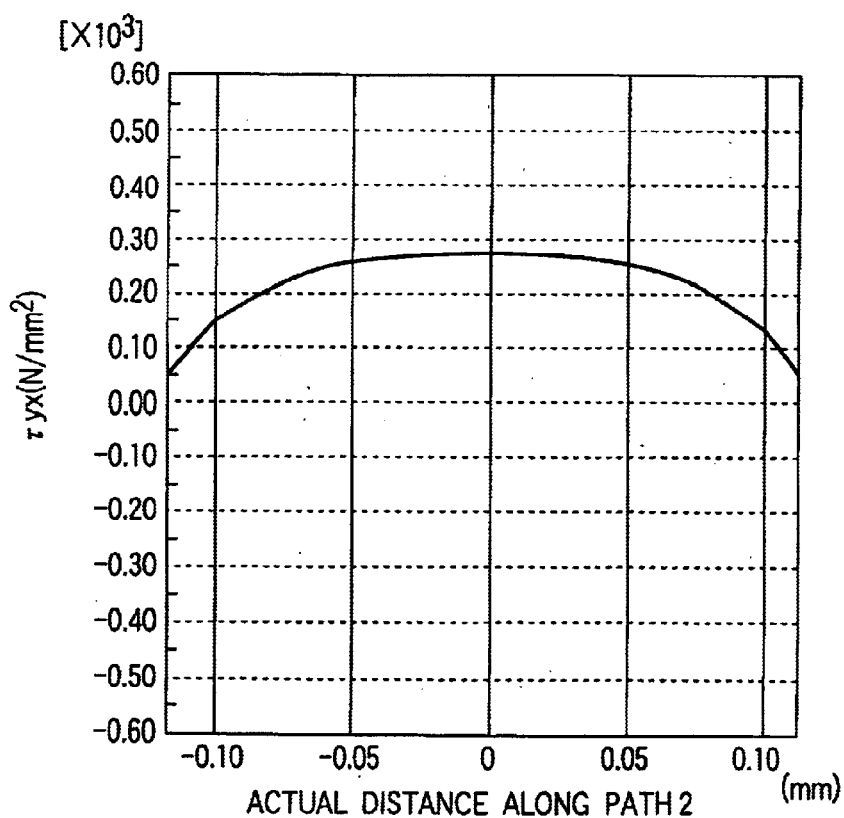
FIG. 13 shows a distribution of the stress $\tau yx$ shown in FIG. 7 along the path 2 passing in the vicinity of the end of the torsion spring.

On the other hand, the torsional deformation of the torsion spring 102 is restricted by the connection portions of the torsion spring 102 in the vicinity of the connection portions with the support 104 and movable plate 106. Therefore, the deformation of the torsion spring 102 is not uniform along the rocking axis, and indicates a distribution different from that of the middle portion of the torsion spring 102. FIGS. 11 to 13 show the simulation results in which the finite element method is used with respect to the stress distribution generated by the torsional deformation. FIGS. 11 to 13 show the stress component distributions along a path 2 passing in the vicinity of the connection portion in the stresses σx, σy, τyx of FIGS. 5 to 7.

Among the respective stress components, the normal stress σy along the rocking axis indicates a maximum value in the vicinity of the upper surface close to the connection portion. Additionally, since the normal stress σy is opposite on opposite sides of the rocking axis, that is, a tensile stress and a compressive stress are generated, a linear element having neither tensile nor compressive stress exists near the rocking axis. As seen from FIG. 12, the stress is small in the vicinity of the linear element. The greater the distance from the linear element is, the larger the stress becomes.

As described above, the stress τyx indicates the maximum value in the middle portion of the torsion spring 102 and σy indicates the maximum value in the connection portion of the torsion spring 102 in the respective stress components. However, when breakage of a conductor (metal) is considered, it is important to specify a region having a high Von Mises stress value, which is broadly used as a yield condition of a metal or another isotropic material.

Figure 14:
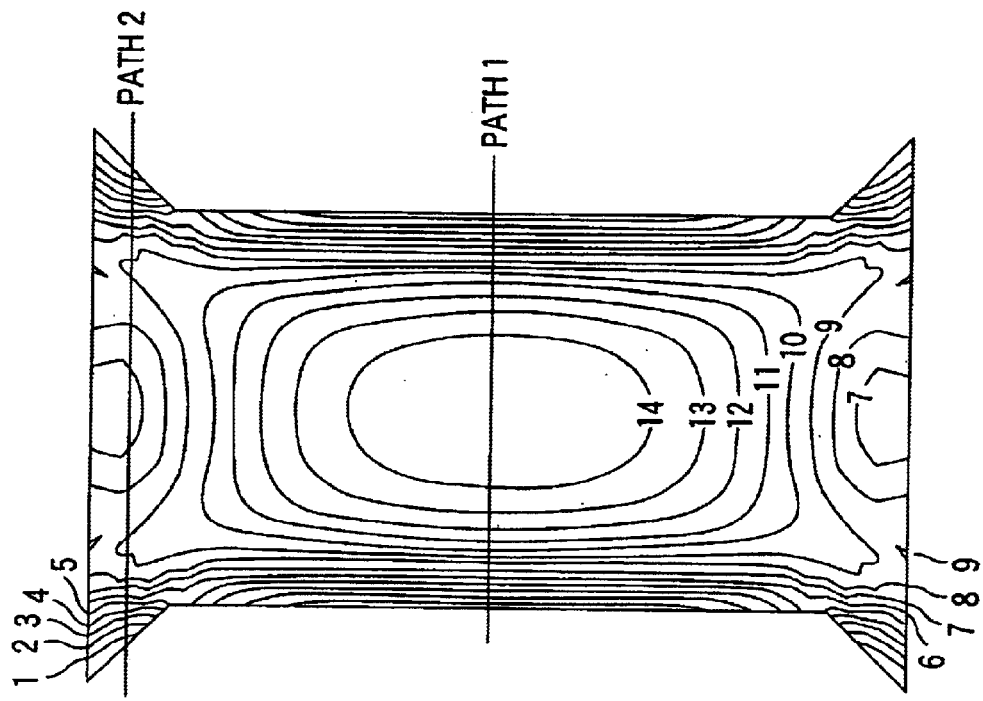
FIG. 14 shows a Von Mises stress distribution obtained by simulation using the finite element method and generated in the vicinity of the upper surface of the torsion spring by the torsional deformation with contour lines.
Figure 14:
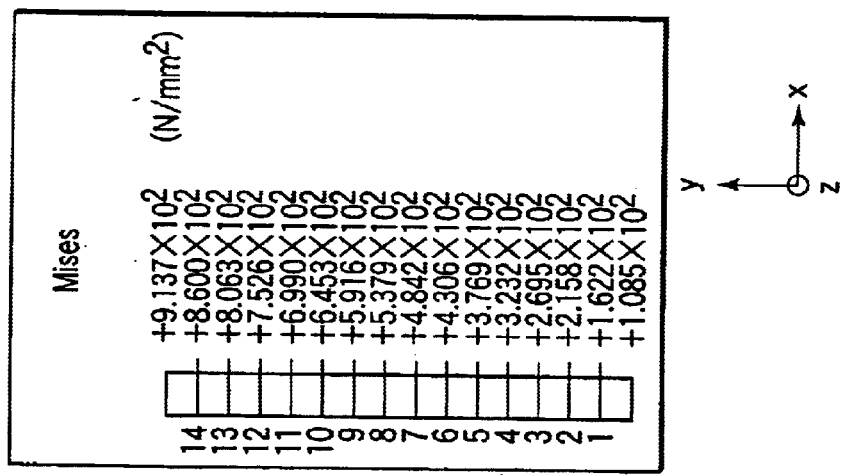
Figure 15:
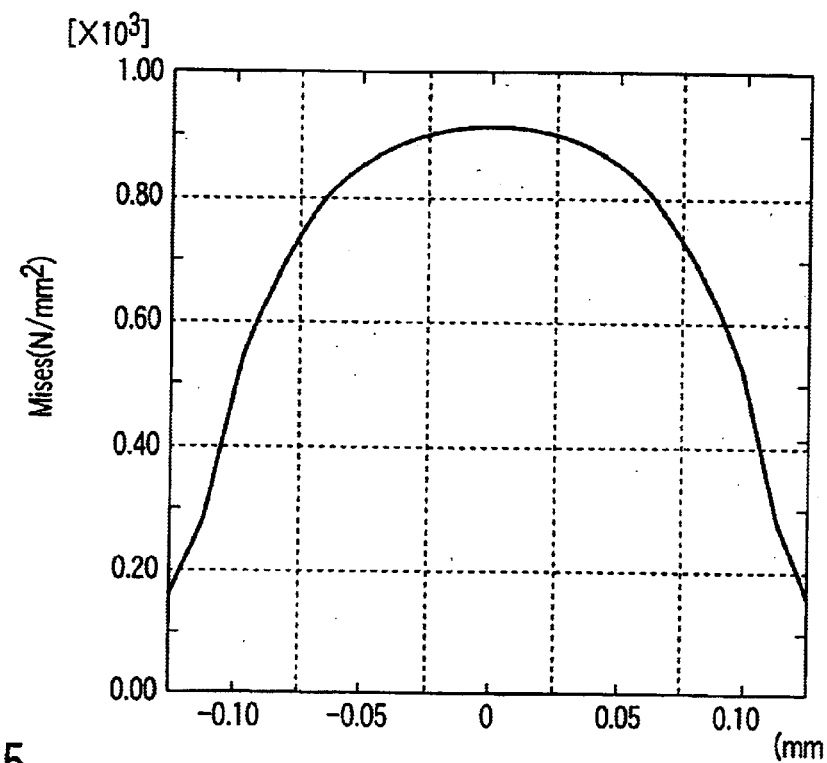
FIG. 15 shows a distribution of the Von Mises stress shown in FIG. 14 along the path 1 passing through the middle portion of the torsion spring along the longitudinal axis.
Figure 16:
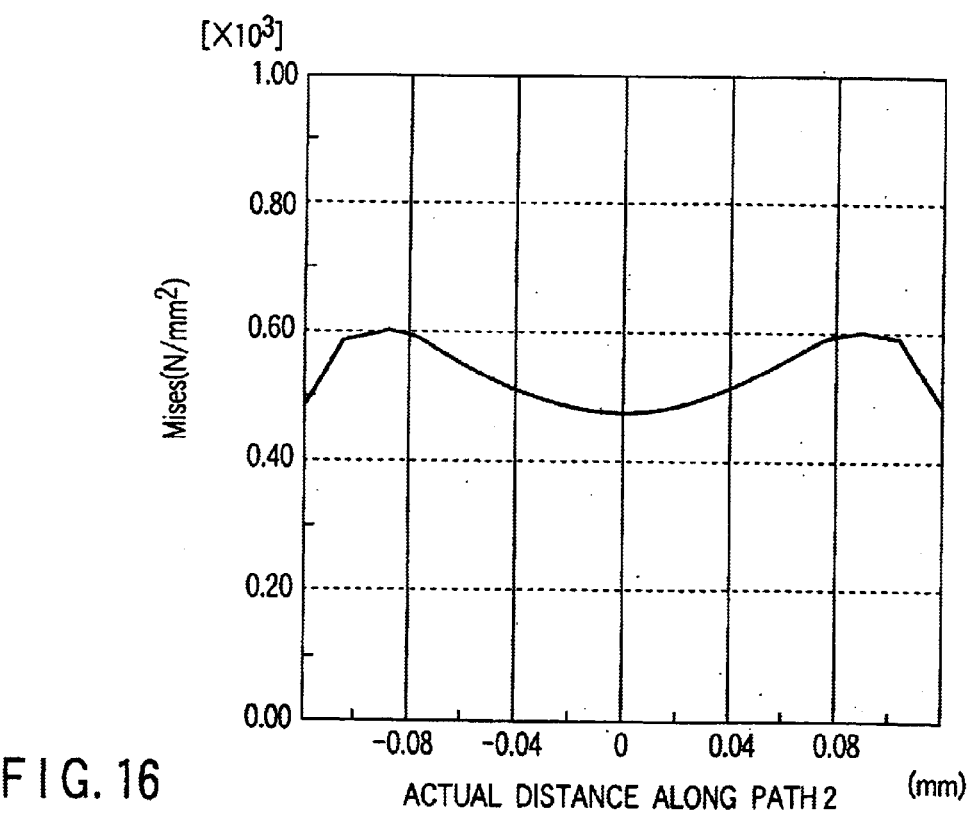
FIG. 16 shows a distribution of the Von Mises stress shown in FIG. 14 along the path 2 passing in the vicinity of the end of the torsion spring.

FIGS. 14 to 16 show the simulation results in which the finite element method is used with respect to the Von Mises stress distribution generated in the vicinity of the upper surface of the torsion spring by the torsional deformation. Similar to FIGS. 5 to 10, the stress distribution in the middle portion of the torsion spring 102 has a maximum value on the Z-axis of the rectangular section of FIG. 2, and is symmetrical with respect to the Z-axis. Moreover, the stress distribution in the connection portion of the torsion spring 102 has a maximum value in the vicinity of opposite edges of the torsion spring 102, and is symmetrical with respect to the Z-axis.

That is, the Von Mises stress distribution has a highest value in the vicinity of the geometric center of the surface of the torsion spring 102. Moreover, the Von Mises stress distribution has a relatively high value in the vicinity of geometric corners of the surface of the torsion spring 102. Additionally, the high value of the Von Mises stress distribution in the vicinity of the geometric center of the surface of the torsion spring 102 is mainly caused by a shear stress. On the other hand, the high value of the Von Mises stress distribution in the vicinity of the geometric corners of the surface of the torsion spring 102 is mainly caused by tensile stress.

The aforementioned stress distribution is an analysis result of the model of the torsion spring structure 100 shown in FIG. 1 in which the support 104 and movable plate 106 are connected to opposite ends of the torsion spring 102. Therefore, the distribution does not depend upon whether the movable plate 106 has a center impeller structure or a cantilever structure.

As described above, in the middle portion of the torsion spring 102 along the rocking axis, the stress value is relatively high in the vicinity of the center as for a transverse axis that crosses at right angles to the rocking axis. In opposite ends of the torsion spring 102 along the rocking axis, the stress value is relatively high in the vicinity of the opposite edges as for the transverse axis crossing at right angles to the rocking axis. This can be generally described.

[First Embodiment]

A torsional rocking structural component of a first embodiment of the present invention will be described. In the first embodiment, the torsional rocking structural component is applied to an electromagnetic driving actuator.

Figure 17:
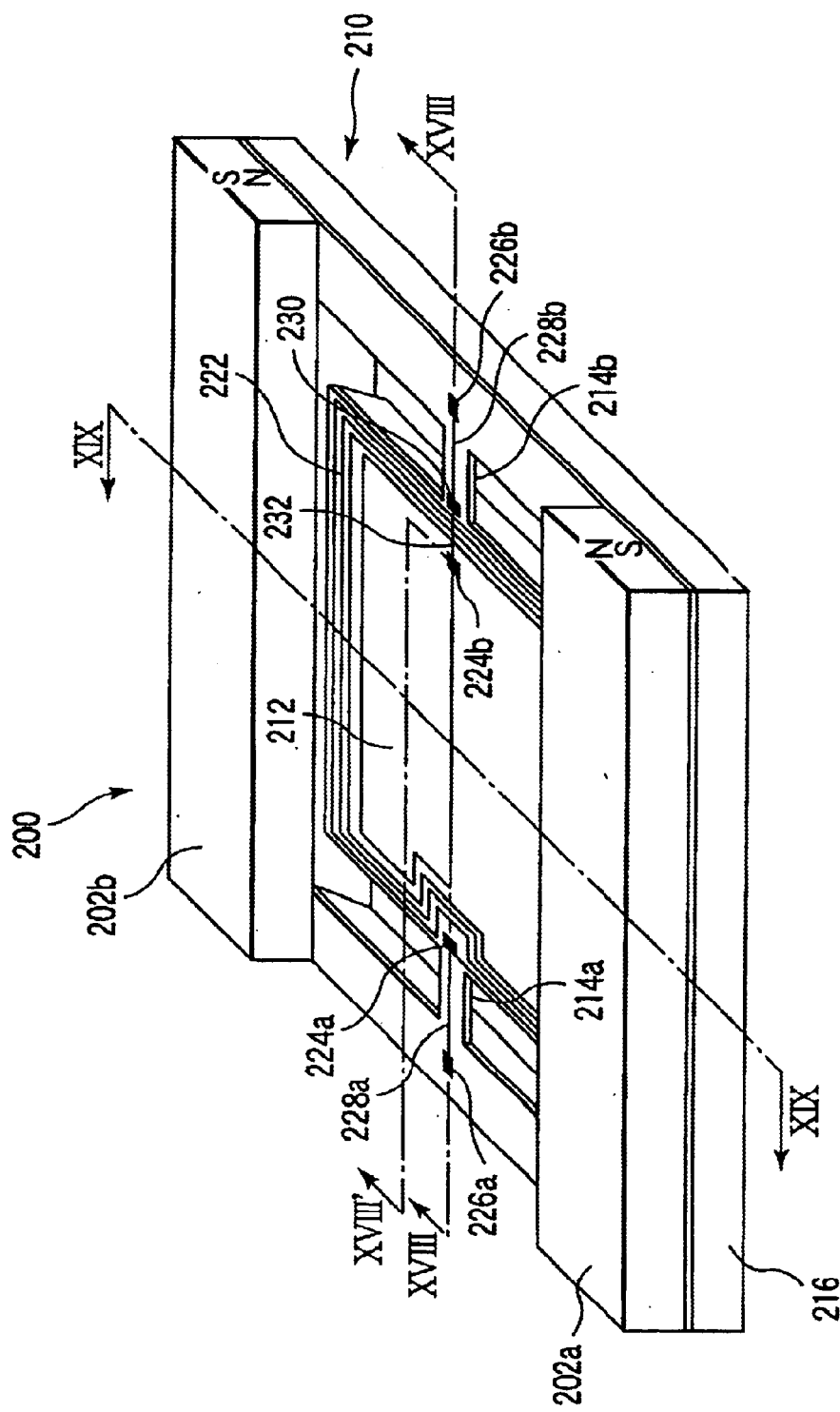
FIG. 17 is a perspective view of a torsional rocking structural component according to a first embodiment.

As shown in FIGS. 17 to 19, an actuator 200 is provided with a torsional rocking structural component 210, and a pair of permanent magnets 202a, 202b. The torsional rocking structural component 210 comprises a movable plate 212, a pair of elastic members 214a, 214b for rockably supporting the movable plate 212, and a support 216 for retaining the elastic members 214a, 214b. The pair of elastic members 214a, 214b symmetrically extend to opposite sides from the movable plate 212, and function as torsion bars. Therefore, the movable plate 212 is supported so as to be allowed to rock with respect to the support 216 about a rocking axis, which passes inside the elastic members 214a, 214b.

Each of the elastic members 214a, 214b has a substantially rectangular parallelepiped shape, and a section of the member vertical to the rocking axis has a rectangular shape. In further detail, each of the elastic members 214a, 214b has one end in the vicinity of the connection portion with the movable plate 212, the other end in the vicinity of the connection portion with the support 216, and a middle portion positioned between the ends. The middle portion has a rectangular parallelepiped shape. Such a shape of the elastic member 214a or 214b is generally selected because of ease of design and manufacturing.

The movable plate 212 has a drive coil 222 drawn around a peripheral edge of the plate. The drive coil 222 has electrode pads 224a, 224b on opposite ends. The support 216 is provided with a pair of electrode pads 226a, 226b for supplying an electric power to the drive coil 222 from the outside. The torsional rocking structural component 210 comprises a wiring 228a passing through the elastic member 214a, and the wiring 228a electrically connects the electrode pad 224a of the drive coil 222 to the electrode pad 226a on the support.

Moreover, the torsional rocking structural component 210 comprises a wiring 228b passing through the elastic member 214b. One end of the wiring 228b is connected to the electrode pad 226b on the support, and the other end thereof is connected to an electrode pad 230. Furthermore, the torsional rocking structural component 210 has a jump wiring 232 extending across the drive coil 222 via an insulating layer, and the jump wiring 232 electrically connects the inner electrode pad 224b of the drive coil 222 to the electrode pad 230 of the wiring 228b.

The movable plate 212, elastic members 214a, 214b and support 216 are monolithically formed from a single-crystal silicon substrate. Therefore, the single-crystal silicon is used as a main material in the movable plate 212, elastic members 214a, 214b and support 216. The single-crystal silicon can be precisely processed, and is therefore preferable for miniaturization of the torsional rocking structural component. Moreover, the single-crystal silicon is high in rigidity and low in material internal damping, and therefore imparts superior properties to the elastic members 214a, 214b for resonance driving. Furthermore, the single-crystal silicon has high rigidity, and is therefore preferable for the material of the support 216 used as a bonding portion for fixing the support to the outside.

The drive coil 222, electrode pads 224a, 224b, 226a, 226b, wirings 228a, 228b, and electrode pad 230 are formed of the same metal film, such as an aluminum film. The film is electrically insulated from the single-crystal silicon substrate as the main material of the movable plate 212, elastic members 214a, 214b and the support 216, for example, by a silicon oxide film. Similarly, the jump wiring is also formed, for example, of an aluminum film, and electrically insulated from the drive coil 222, for example, by a silicon oxide film.

Moreover, the metal film including the wirings 228a, 228b, and the like is generally formed in the vicinity of the surface to aid easy manufacture. Therefore, the wirings 228a, 228b are positioned in the vicinity of the surfaces of the elastic members 214a, 214b, respectively.

The pair of permanent magnets 202a, 202b are disposed outside opposite vibrating ends of the movable plate 212 and substantially parallel to the rocking axis. Magnetization directions of the permanent magnets 202a, 202b are directed opposite to each other, and are substantially vertical to the surface of the movable plate 212 in a stationary state. The permanent magnets 202a, 202b generate a magnetic field crossing at right angles to the rocking axis, so that a magnetic field component acts on drive coil 222 portions positioned on opposite ends of the movable plate 212 in a surface direction of the movable plate 212.

An operation of the actuator 200 will next be described. In FIG. 17, when an alternating-current voltage is applied to two electrode pads 226a, 226b on the support 216, an alternating current flows through the drive coil. 222. The current flowing in the portion of the drive coil 222 in the vicinity of the permanent magnets 202a, 202b is subject to a Lorentz force by an interaction with the magnetic field generated by the permanent magnets 202a, 202b, and the movable plate 212 is subjected to a couple in a plate thickness direction. Therefore, the movable plate 212 uses a center axis extending along a longitudinal axis of two elastic members 214a, 214b as the rocking axis to rock, that is, to torsionally vibrate.

A moment for generating the torsional vibration is determined by a product of the Lorentz force acting on the drive coil 222 portions in the vicinity of the permanent magnets 202a, 202b with a distance between the rocking axes passing through two elastic members 214a, 214b and the drive coil 222 portions in the vicinity of the permanent magnets 202a, 202b. The Lorentz force is determined by the properties of the permanent magnets 202a, 202b, the number of windings and wiring length of the drive coil 222, current value, distance between the permanent magnets 202a, 202b and the drive coil 222, and the like. The drive coil 222 is formed to turn around an outermost periphery of the movable plate 212, in order to increase the amount of force generated and the moment.

When an alternating-current voltage having a frequency equal to a resonance frequency univocally determined by shapes and materials of the movable plate 212 and elastic members 214a, 214b is applied, the movable plate 212 vibrates with a maximum amplitude by the current flowing through the drive coil 222. For example, when a reflection mirror for reflecting a beam received from the outside is disposed on the movable plate 212, the actuator 200 can be used as an optical scanner for scanning the reflected beam.

Figure 20:
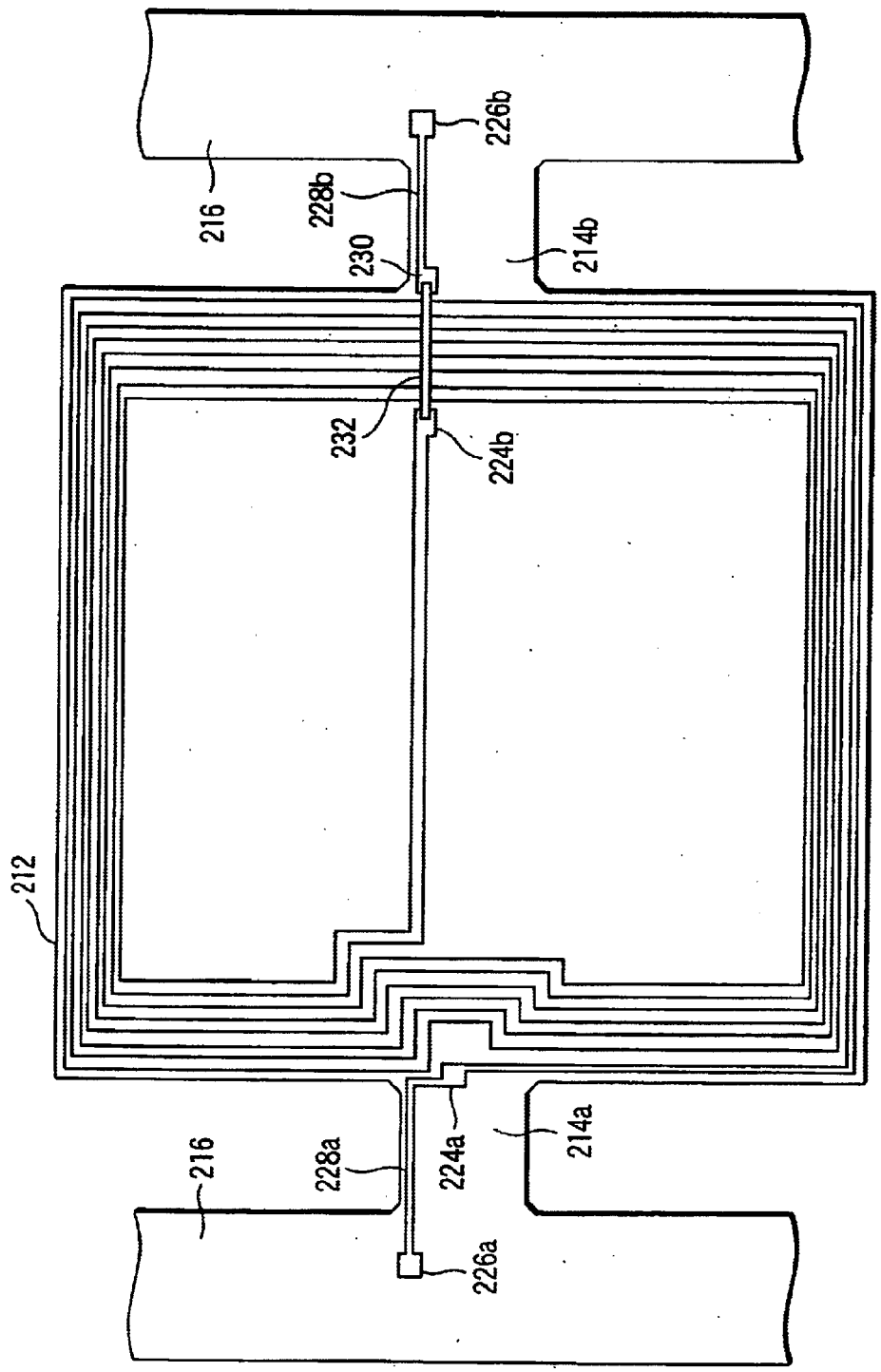
FIG. 20 is a plan view of an enlarged portion of the torsional rocking structural component of FIG. 17, showing a movable plate and elastic member.
Figure 21:
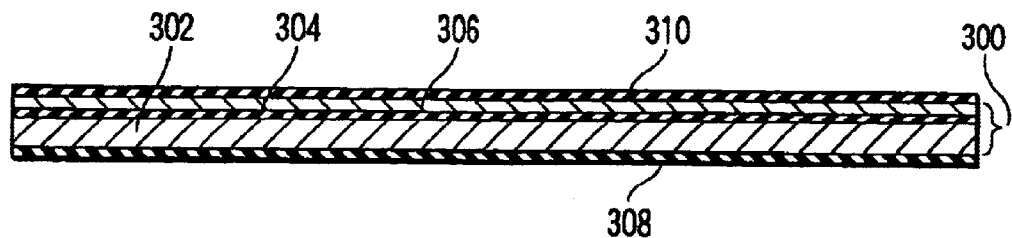
FIG. 21 shows a first step of a process of manufacturing the torsional rocking structural component according to the first embodiment with a section taken along line XVIII'–XVIII of FIG. 17.
Figure 22:
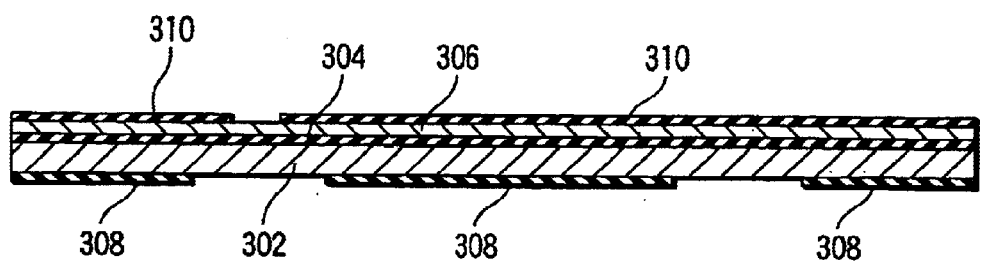
FIG. 22 shows a step subsequent to the step of FIG. 21 in the process of manufacturing the torsional rocking structural component according to the first embodiment with the section taken along line XVIII'–XVIII of FIG. 17.
Figure 23:
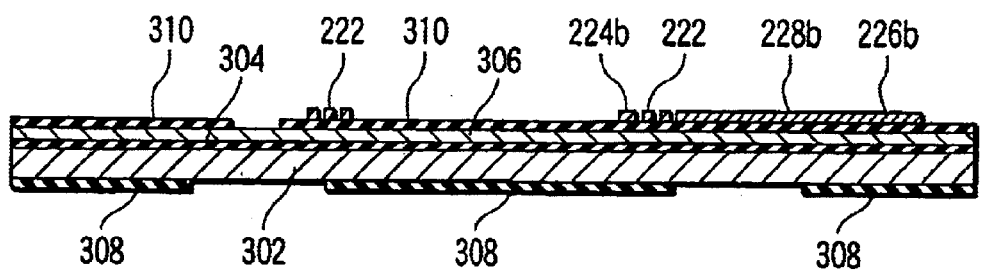
FIG. 23 shows a step subsequent to the step of FIG. 22 in the process of manufacturing the torsional rocking structural component according to the first embodiment with the section taken along line XVIII'–XVIII of FIG. 17.
Figure 24:
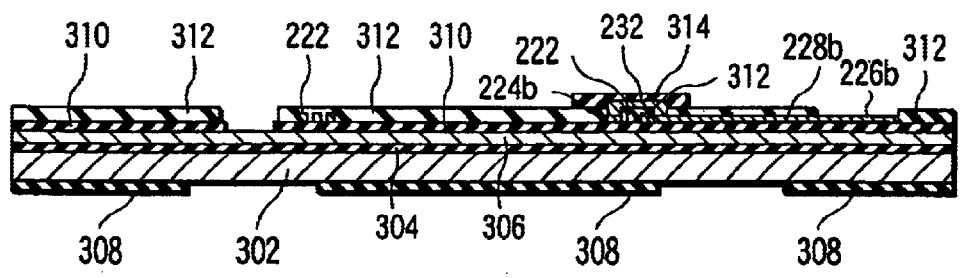
FIG. 24 shows a step subsequent to the step of FIG. 23 in the process of manufacturing the torsional rocking structural component according to the first embodiment with the section taken along line XVIII'–XVIII of FIG. 17.
Figure 25:
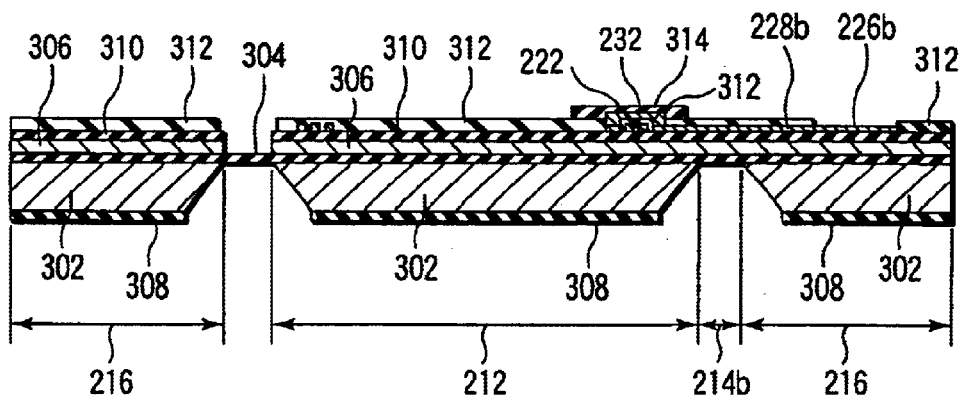
FIG. 25 shows a step subsequent to the step of FIG. 24 in the process of manufacturing the torsional rocking structural component according to the first embodiment with the section taken along line XVIII'–XVIII of FIG. 17.
Figure 26:
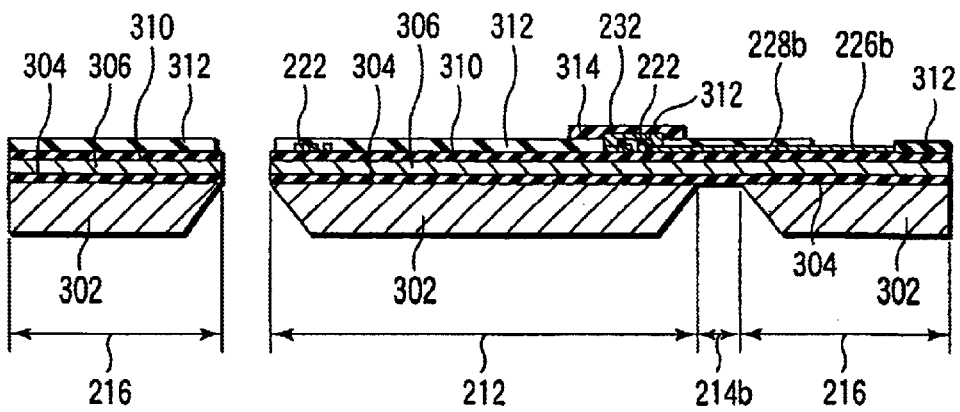
FIG. 26 shows a last step subsequent to the step of FIG. 25 in the process of manufacturing the torsional rocking structural component according to the first embodiment with the section taken along line XVIII'XVIII of FIG. 17.

In the first embodiment, as shown in FIG. 20, each of the wirings 228a, 228b passes in the vicinity of one of the opposite edges of the elastic members 214a, 214b as for the transverse axis crossing at right angles to the rocking axis. That is, the wirings 228a, 228b extend, avoiding the vicinity of the geometric center of the surface of the elastic members 214a, 214b, in which a Von Mises stress is highest. Therefore, the occurrence of disconnection of the wirings 228a, 228b due to torsional movement of the elastic members 214a, 214b is reduced. Therefore, there is little fear that the wirings 228a, 228b will be disconnected by torsional movement of the elastic members 214a, 214b. As a result, the torsional rocking structural component 210 having high reliability and durability can be obtained. Additionally, in an ordinary case, the rigidity of the wirings 228a, 228b can be ignored as compared with the rigidity of the elastic members 214a, 214b.

The torsional rocking structural component of the first embodiment is prepared utilizing a semiconductor process. A method of manufacturing the torsional rocking structural component 210 of the first embodiment will be described hereinafter with reference to FIGS. 21 to 26. FIGS. 21 to 26 show sections taken along line XVIII'-XVIII of FIG. 17.

Step 1 (FIG. 21): A silicon on insulator (SOI) substrate 300 is prepared as a start wafer. The SOI substrate 300 is a structure obtained by attaching a single-crystal silicon substrate 306, also called an active layer substrate, to a silicon substrate 302, also called a support substrate, via an insulating layer 304. The support substrate 302 has a thickness, for example, of 200 to 500 $\mu$m, the insulating layer 304 has a thickness, for example, of 1 $\mu$m, and the active layer substrate 306 has a thickness, for example, of 100 $\mu$m. The SOI substrate 300 is cleaned, a thermal oxide film 310 is formed on a front surface of the substrate, and a thermal oxide film 308 is formed on a back surface of the substrate.

Step 2 (FIG. 22): The thermal oxide film 308 formed on the back surface of the SOI substrate 300 is used as a mask material for separating the movable plate 212 and support 216 from the back surface. Moreover, the thermal oxide film 310 formed on the front surface of the SOI substrate 300 is used as a mask material for forming the movable plate 212, elastic members 214a, 214b and support 216 from the front surface. Therefore, portions from which silicon is later to be removed are removed beforehand from the thermal oxide films 308 and 310 by etching.

Step 3 (FIG. 23): An aluminum thin film 312 is formed on the front-surface thermal oxide film 310 by sputtering, and etched, so that the drive coil 222, electrode pad 224b, wiring 228b, electrode pad 226b, and the like are formed.

Step 4 (FIG. 24): Subsequently, for example, the plasma oxide film 312 for forming an interlayer insulating film is formed. Only a portion with the front-surface thermal oxide film 310 etched therefrom and with silicon exposed thereto, a portion for forming an interlayer contact, the electrode pad 226b, and other upper portions are removed by etching. Furthermore, a second aluminum thin film 314 is formed on the plasma oxide film 312 by sputtering, and etched, so that the jump wiring 232 for connecting the inner electrode pad 224b of the drive coil 222 to the outside of the coil is formed. Additionally, in order to protect the jump wiring 232 from rusting, the second plasma oxide film 314 is formed only on the upper portion of the jump wiring 232.

Step 5: (FIG. 25): The active layer substrate 306 of the SOI substrate 300 is etched from the front surface in the form of the movable plate 212, elastic members 214a, 214b and support 216 by dry etching. In this case, a reactive ion etching (RIE) is performed utilizing an inductively-coupled plasma (ICP), and thereby an etched side surface is processed substantially vertically to the substrate surface. The etching reaches the insulating layer 304 of the SOI substrate 300 and then stops. Subsequently, in order to form the movable plate 212 and support 216 on the back surface, an alkaline solution is used to perform an anisotropic etching on the silicon substrate 302 from the back surface of the SOI substrate 300.

Step 6 (FIG. 26): After the etching of the silicon substrate 302, the insulating layer 304 exposed on the back surface of the elastic members 214a, 214b and between the movable plate 212 and the support 216 is removed by dry etching, and the torsional rocking structural component 210 is completed. When the torsional rocking structural component 210 is used, for example, as an optical scanner, it is preferable to sputter gold or aluminum on the back surface of the movable plate 212 and form a reflection surface having a high reflectance if necessary.

As described above, since the torsional rocking structural component 210 of the first embodiment is integrally formed utilizing the semiconductor manufacturing technique, a subsequent assembly operation is unnecessary, and a large amount of microfine and inexpensive torsional rocking structural component can be produced. Additionally, the dimensional precision is very high, and therefore variations in the properties of the material are very low.

The respective constitutions of the first embodiment are not limited to the aforementioned constitutions, and can be variously modified or changed.

For example, the drive coil 222 is formed by aluminum sputtering film formation and etching, but may be formed by plating. Particularly, when a large deflection angle is necessary, the number of windings of the drive coil 222 needs to be increased. However, if only the number of windings is increased without increasing the sectional area of the coil, the coil resistance increases. This results in an increase of the power voltage or power consumption. A coil having a thickness greater than the thickness of the coil prepared by sputtering is formed by plating, the aspect ratio is thereby enhanced, and predetermined specifications can be satisfied.

Moreover, the driving method is not limited to a reciprocating driving method by the alternating current having the frequency equal to the resonance frequency. For example, the device may be statically positioned by driving it, for example, by a variable frequency or a direct current.

Modifications of the first embodiment will be described hereinafter with reference to the drawings. In the following description, members equivalent to the aforementioned members are denoted with the same reference numerals, and a detailed description thereof is omitted.

Figure 27:
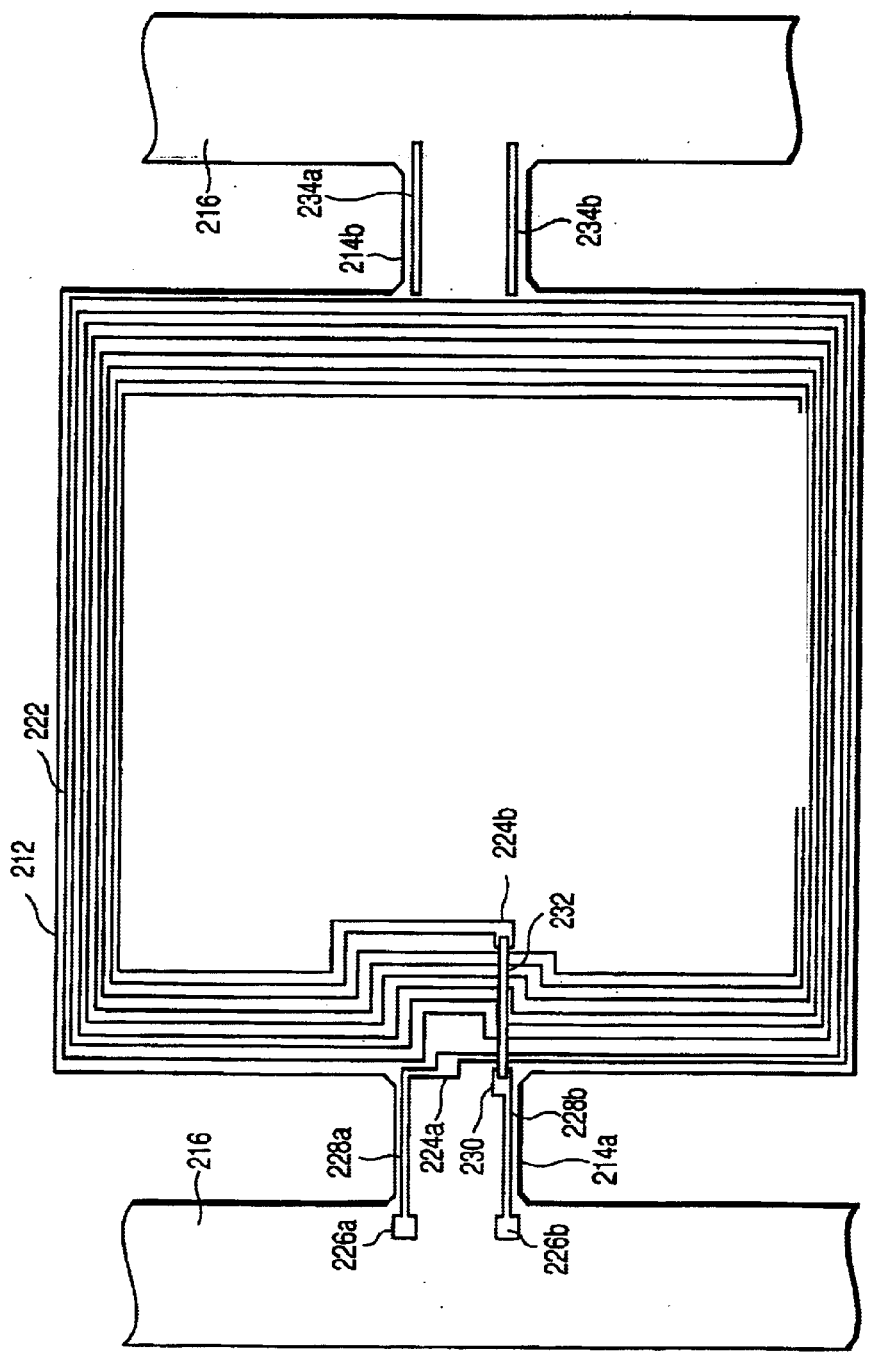
FIG. 27 is a partial plan view of the torsional rocking structural component according to a first modification of the torsional rocking structural component of the first embodiment.

In the torsional rocking structural component of a first modification, as shown in FIG. 27, both the wirings 228a and 228b pass through the elastic member 214a. In further detail, the wirings 228a, 228b pass in the vicinity of the opposite edges of the elastic member 214a. In other words, the wirings 228a, 228b extend, avoiding the vicinity of the geometric center of the surface of the elastic member 214a in which the Von Mises stress is highest. Therefore, there is little fear that the wirings 228a, 228b are disconnected by torsional movement of the elastic member 214a.

Moreover, the wirings 228a, 228b are arranged symmetrically with respect to the rocking axis. Therefore, the elastic member 214a has torsion properties with satisfactory symmetry with respect to a torsion direction.

The opposite-side elastic member 214b may be provided with dummy wirings 234a, 234b, in order to enhance the symmetry of the torsion properties of the left and right elastic members 214a, 214b. The dummy wirings 234a, 234b are formed of the same material as that of the wirings 228a, 228b. Similarly as the wirings 228a, 228b, the dummy wiring may pass in the vicinity of the opposite edges of the elastic member 214b.

Moreover, in the torsional rocking structural component of the first modification, since both of two wirings 228a, 228b pass through the elastic member 214a, two electrode pads 226a, 226b are disposed in the vicinity. This arrangement provides an advantage that an operation for connecting the wiring to the outside can be easily performed.

Figure 28:
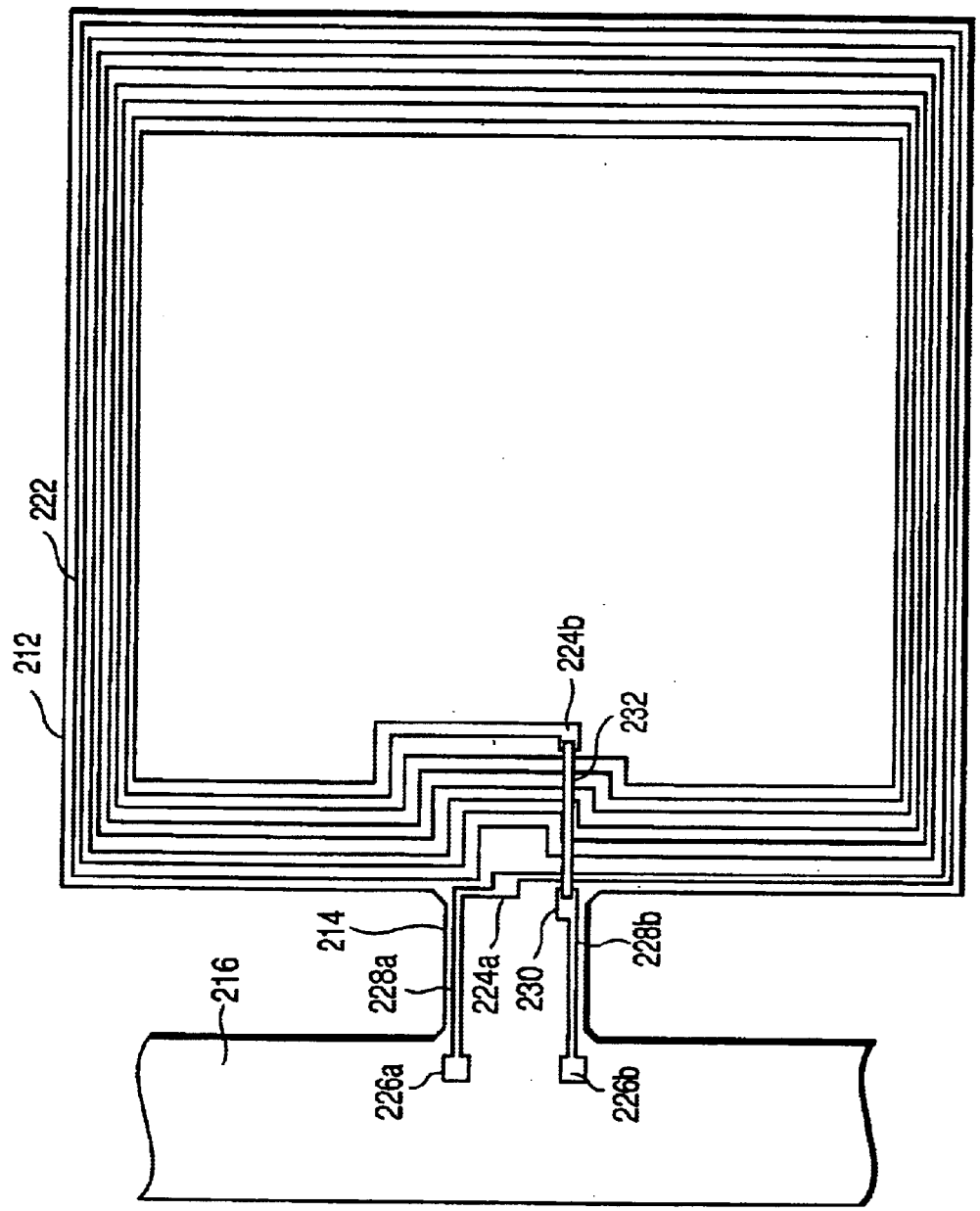
FIG. 28 is a partial plan view of the torsional rocking structural component according to a second modification of the torsional rocking structural component of the first embodiment.

As shown in FIG. 28, the torsional rocking structural component of a second modification includes the movable plate 212, one elastic member 214 for rockably supporting the movable plate 212, and the support 216 for holding the elastic member 214. That is, the movable plate 212 is supported by a cantilever structure so as to be allowed to rock.

The wirings 228a, 228b pass in the vicinity of the opposite edges of the elastic member 214. That is, the wirings 228a, 228b extend, avoiding the vicinity of the geometric center of the surface of the elastic member 214 in which the Von Mises stress is highest. Therefore, there is little fear that the wirings 228a, 228b are disconnected by the torsional movement of the elastic member 214.

Figure 29:
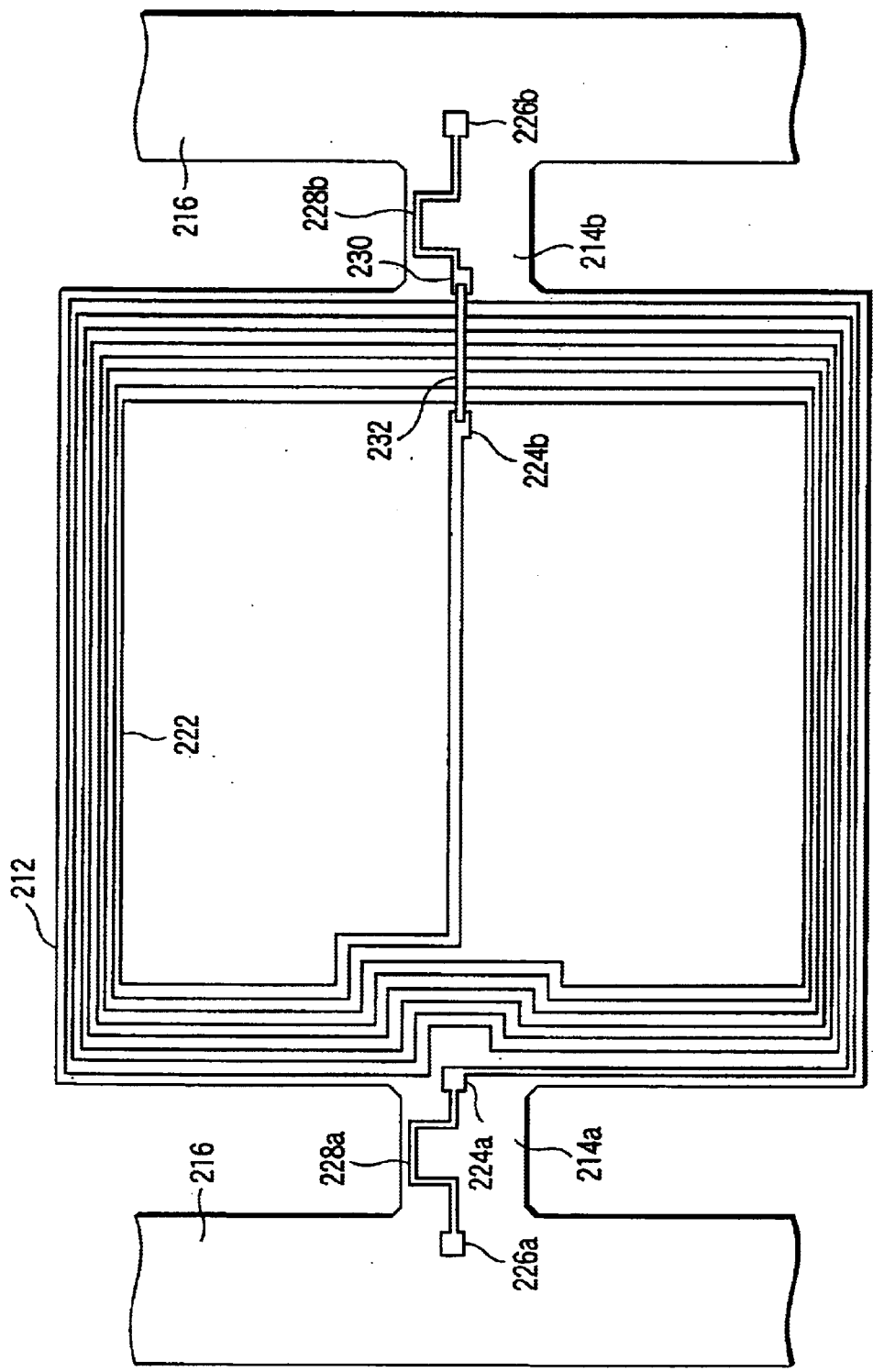
FIG. 29 is a partial plan view of the torsional rocking structural component according to a third modification of the torsional rocking structural component of the first embodiment.

In the torsional rocking structural component of a third modification, as shown in FIG. 29, the wirings 228a, 228b pass in the vicinity of one of the opposite edges of the elastic members 214a, 214b in the middle portions of the elastic members 214a, 214b. In the ends of the elastic members 214a, 214b, that is, in the vicinity of the connection portions with the movable plate 212 and support 216, the wirings 228a, 228b pass in the vicinity of the center of the elastic members 214a, 214b as for the transverse axis crossing at right angles to the rocking axis.

As described above, the Von Mises stress distribution has a highest value in the vicinity of the geometric center of the surface of the torsion spring 102, and has a relatively high value in the vicinity of the geometric corners of the surface of the torsion spring 102. Therefore, in other words, the wirings 228a, 228b extend, avoiding the vicinity of the geometric center of the surface of the elastic members 214a, 214b in which the Von Mises stress is highest, and avoiding the vicinity of the geometric corners of the surface of the elastic members 214a, 214b in which the Von Mises stress is relatively high. Therefore, in the third modification, there is little fear that the wirings 228a, 228b are disconnected by the torsional movement of the elastic member 214a.

Figure 30:
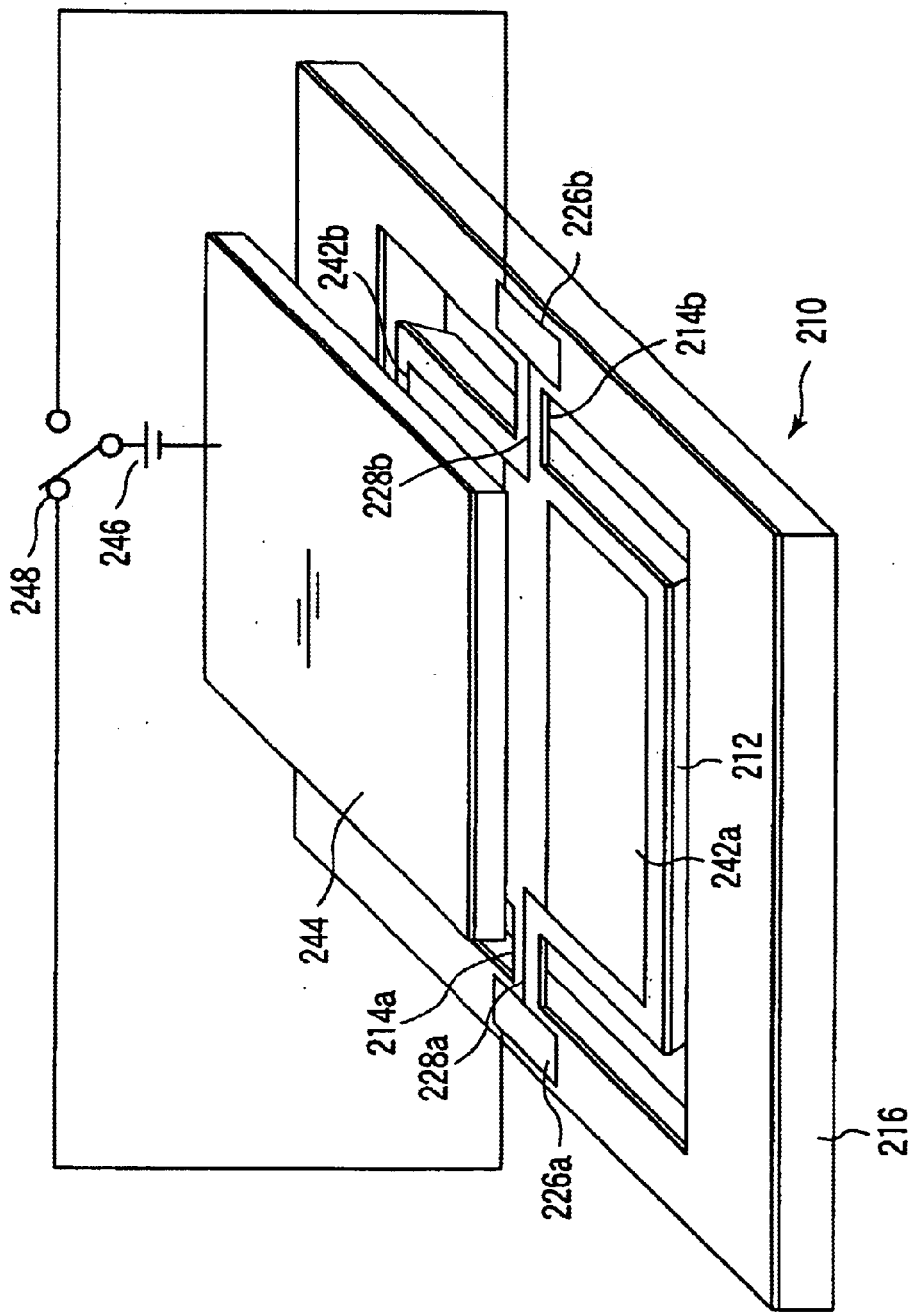
FIG. 30 is a perspective view of an electrostatic driving actuator including the torsional rocking structural component according to a fourth modification of the torsional rocking structural component of the first embodiment.
Figure 31:
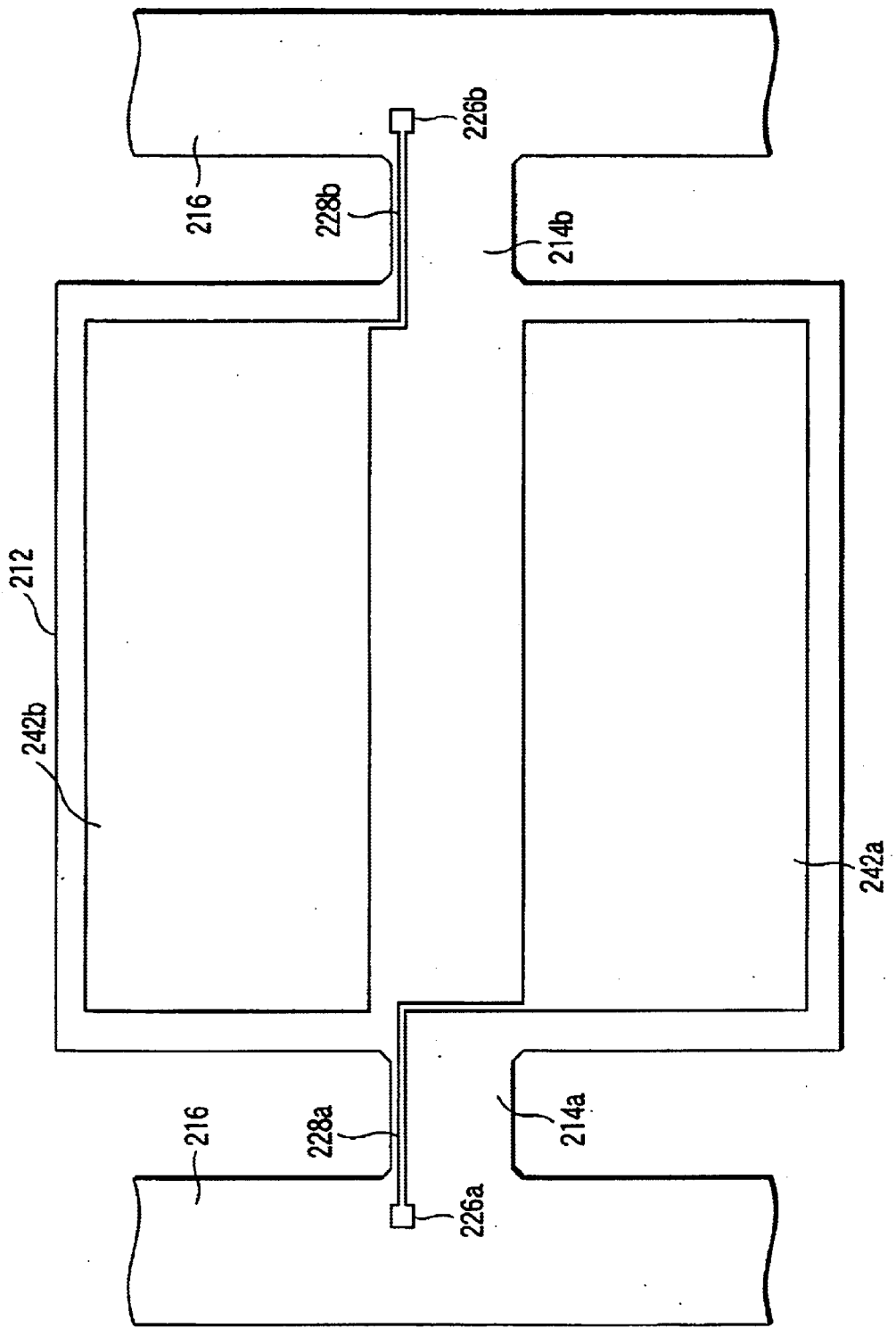
FIG. 31 is an enlarged partial plan view of the torsional rocking structural component according to the fourth modification of the torsional rocking structural component of the first embodiment shown in FIG. 30.

According to a fourth modification, there is a torsional rocking structural component applied to an electrostatic driving actuator. In the torsional rocking structural component of the fourth modification, as shown in FIGS. 30 and 31, the movable plate 212 is provided with a pair of movable electrodes 242a, 242b. The movable electrodes 242a, 242b are symmetrically arranged on the opposite sides of the rocking axis, respectively. The movable electrode 242a is electrically connected to the electrode pad 226a positioned on the support 216 via the wiring 228a passing through the elastic member 214a. Similarly, the movable electrode 242b is electrically connected to the electrode pad 226b positioned on the support 216 via the wiring 228b passing through the elastic member 214b.

The actuator is provided with a fixed electrode 244 fixed to a fixing member (not shown). The fixed electrode 244 is disposed opposite to the movable electrodes 242a, 242b disposed on the movable plate 212. The fixed electrode 244 is connected to the electrode pads 226a, 226b via a power supply 246 and switch 248. The switch 248 is changed over to selectively apply a potential difference between one of the movable electrodes 242a, 242b and the fixed electrode 244. As a result, an electrostatic attraction force is generated between one of the movable electrodes 242a, 242b and the fixed electrode 244 because of the potential difference applied therebetween. Thereby, the movable plate 212 follows the electrostatic attraction force and is inclined in a corresponding direction. When the switch 248 is alternately operated, the movable plate 212 is vibrated about the rocking axis passing through the elastic members 214a, 214b.

As shown in FIG. 31, the wirings 228a, 228b pass in the vicinity of one of the opposite edges of the elastic members 214a, 214b. That is, the wirings 228a, 228b extend, avoiding the vicinity of the geometric center of the surface of the elastic members 214a, 214b in which the Von Mises stress is highest. Therefore, there is little fear that the wirings 228a, 228b are disconnected by the torsional movement of the elastic member 214a.

The actuator including the torsional rocking structural component of the present modification may be driven by a method other than the method of operating the switch 248. For example, two electrode pads 226a, 226b may be connected to separate variable power supplies. In this case, the actuator is driven by applying predetermined voltages from the respective variable power supplies.

Moreover, the modifications shown in FIGS. 27 to 29 may be applied to the torsional rocking structural component of the present modification applied to the electrostatic driving actuator.

In any one of the aforementioned embodiments and modifications, the torsional rocking structural component with 1 degree of freedom has been illustrated, but the present invention may be applied to the torsional rocking structural component with 2 degrees of freedom such as a gimbal structure.

[Second Embodiment]

The torsional rocking structural component of a second embodiment of the present invention will be described. The torsional rocking structural component of the second embodiment is constituted by adding a vibration detection coil to the torsional rocking structural component of the first embodiment. In the following description, members equivalent to the members described above in the first embodiment are denoted with the same reference numerals, and a detailed description thereof is omitted.

Figure 32:
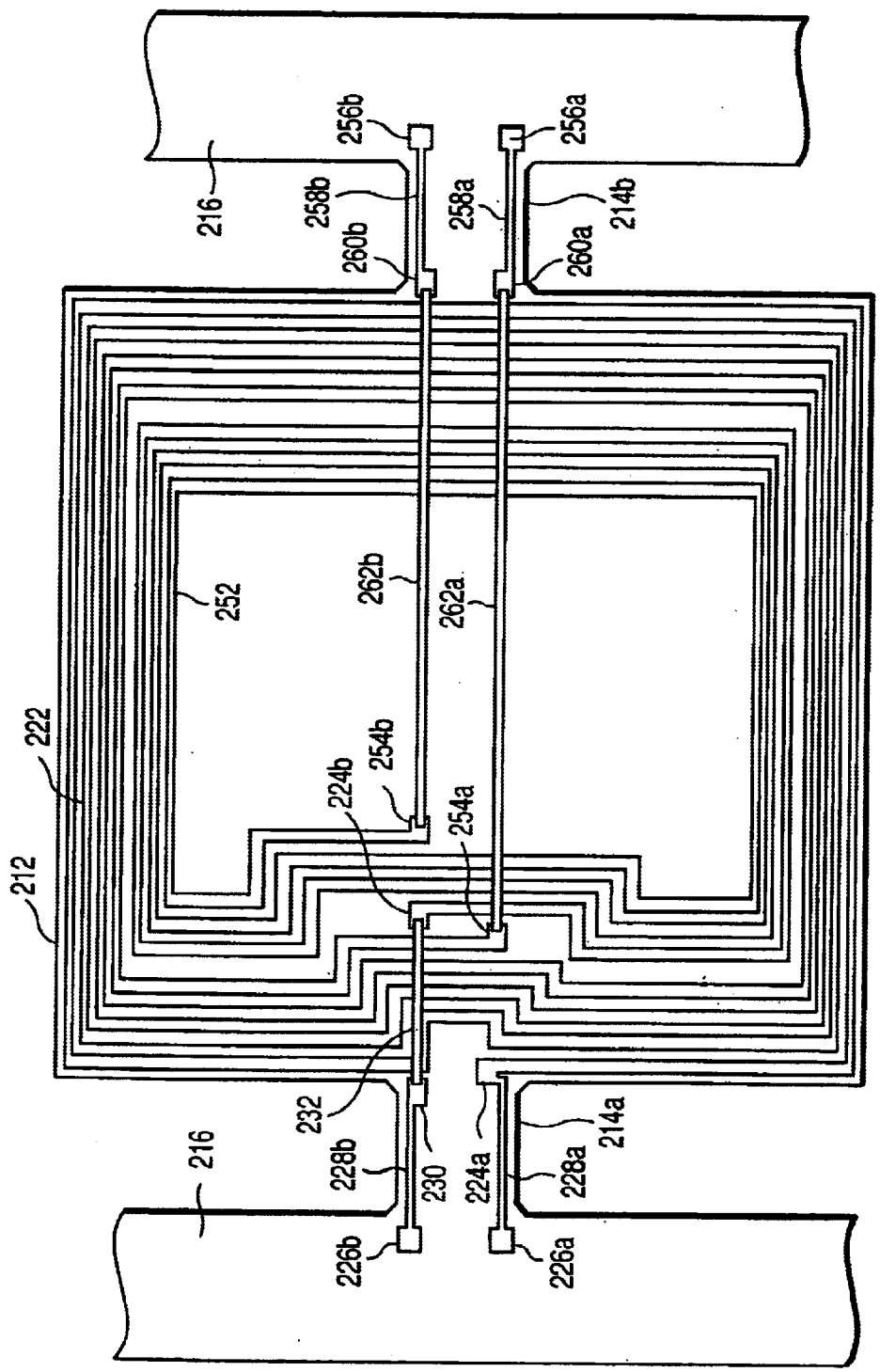
FIG. 32 is a partial plan view of the torsional rocking structural component according to a second embodiment of the present invention.

As shown in FIG. 32, the torsional rocking structural component of the second embodiment comprises the movable plate 212, the pair of elastic members 214a, 214b for rockably supporting the movable plate 212, the elastic members allowing the movable plate 212 to rock about a rocking axis extending inside of thereof, and the support 216 for holding the elastic members 214a, 214b. The movable plate 212 is provided with the drive coil 222 drawn around the peripheral edge of the plate, and a vibration detection coil 252 drawn inside the drive coil 222.

The torsional rocking structural component 210 also comprises the wirings 228a, 228b passing through the elastic member 214a. One end of the wiring 228a is connected to the electrode pad 226a on the support, and the other end thereof is connected to the electrode pad 224a of the drive coil 222. One end of the wiring 228b is connected to the electrode pad 226b on the support, and the other end thereof is connected to the electrode pad 230. The electrode pad 230 is connected to the inner electrode pad 224b of the drive coil 222 via the jump wiring 232 extending across the drive coil 222 via the insulating layer.

The torsional rocking structural component 210 further comprises wirings 258a, 258b passing through the elastic member 214b. One end of the wiring 258a or 258b is connected to an electrode pad 256a or 256b on the support 216, and the other end thereof is connected to an electrode pad 260a or 260b. The electrode pads 260a, 260b are connected to electrode pads 254a, 254b of the vibration detection coil 252 via jump wirings 262a, 262b extending across the drive coil 222 and vibration detection coil 252 via the insulating layer.

The wirings 228a, 228b pass in the vicinity of the opposite edges of the elastic member 214a. That is, the wirings 228a, 228b extend, avoiding the vicinity of the geometric center of the surface of the elastic members 214a in which the Von Mises stress is highest. Therefore, there is little fear that the wirings 228a, 228b are disconnected by the torsional movement of the elastic member 214a. Moreover, the wirings 228a, 228b are arranged symmetrically with respect to the rocking axis. Therefore, the elastic member 214a has torsion properties having satisfactory symmetry with respect to the torsion direction.

Similarly, the wirings 258a, 258b pass in the vicinity of the opposite edges of the elastic member 214b. That is, the wirings 258a, 258b extend, avoiding the vicinity of the geometric center of the surface of the elastic members 214b in which the Von Mises stress is highest. Therefore, there is little fear that the wirings 258a, 258b are disconnected by the torsional movement of the elastic member 214b. Moreover, the wirings 258a, 258b are arranged symmetrically with respect to the rocking axis. Therefore, the elastic member 214b has torsional properties having a satisfactory symmetry with respect to the torsion direction.

Furthermore, the elastic members 214a, 214b have the wirings 228a, 228b, 258a, 258b. The wirings 228a, 228b, 258a, 258b are preferably formed of the same material, and are symmetrically disposed. Therefore, the elastic members 214a, 214b have substantially the same torsional properties.

The torsional rocking structural component of the second embodiment is manufactured by a manufacturing method similar to that of the torsional rocking structural component of the first embodiment. The second embodiment is the same as the first embodiment, except that the vibration detection coil 252 is simultaneously formed during formation of the drive coil 222, and a detailed description thereof is omitted.

Similarly as the torsional rocking structural component of the first embodiment, the torsional rocking structural component of the second embodiment is applied to the electromagnetic driving actuator. A driving method of the actuator is the same as that of the actuator including the torsional rocking structural component of the first embodiment, and a detailed description thereof is omitted.

The actuator including the torsional rocking structural component of the second embodiment can monitor a vibration state of the movable plate 212. With the vibration of the movable plate 212, the vibration detection coil 252 moves within the magnetic field formed by the permanent magnet. Therefore, electromagnetic induction generates an electromotive force in the vibration detection coil 252. A polarity of the electromotive force is determined by a movement direction of the vibration detection coil 252, and a size of the force is determined by a magnetic flux density, coil winding number, coil movement speed, coil length in the magnetic field, and the like.

As a result, a signal proportional to the vibration speed of the movable plate 212 is outputted from the vibration detection coil 252. Therefore, the vibration state of the movable plate 212 can be monitored based on the signal. Moreover, the vibration of the movable plate 212 can also be controlled based on the signal. Concretely, based on the output signal of the vibration detection coil 252, changes of a resonance frequency and deflection angle caused by an environmental change, and the like can be controlled and automatically corrected.

Similarly as the first embodiment, when the reflection mirror for reflecting the beam incident from the outside is disposed on the movable plate 212, the actuator can be used as the optical scanner for scanning the reflected beam. Moreover, the properties that enable the actuator to detect the deflection angle are utilized, and the actuator can also be used as a sensor for detecting an angular speed and acceleration.

As described above, in the torsional rocking structural component of the second embodiment, the wirings 228a, 228b passing through the elastic member 214a and wirings 258a, 258b passing through the elastic member 214b extend, avoiding the vicinity of the geometric center of the surface of the elastic members 214a, 214b in which the Von Mises stress is highest. Therefore, there is little fear that the wirings 228a, 228b, 258a, 258b are disconnected by the torsional movement of the elastic members 214a, 214b. Therefore, the torsional rocking structural component having high reliability and durability can be obtained.

Moreover, since the torsional rocking structural component of the second embodiment is integrally formed utilizing the semiconductor manufacturing technique, the subsequent assembly operation is unnecessary, and a large amount of the microfine and inexpensive torsional rocking structural component can be produced. Additionally, the dimensional precision is very high, and the properties dispersion is therefore remarkably little.

The respective constitutions of the second embodiment are not limited to the aforementioned constitutions, and can variously be modified or changed.

For example, the drive coil 222 is formed by aluminum sputtering film formation and etching processing similarly as in the first embodiment, but may be formed by plating. Particularly, when the aspect ratio of the drive coil 222 is enhanced by plating, the coil resistance is prevented from increasing, and an increase of the power voltage and power consumption is suppressed. In addition to these advantages, an occupied width of the drive coil 222 can advantageously be reduced. Therefore, the drive coil 222 can be disposed further in the vicinity of the peripheral edge of the movable plate 212, and the sensitivity of the vibration detection coil 252 can be enhanced. Alternatively, the drive coil 222 and vibration detection coil 252 may be formed in separate superposed layers via the insulating layer. Particularly, to enhance the sensitivity, the vibration detection coil 252 is superposed onto the drive coil 222 and formed in the vicinity of the peripheral edge of the movable plate 212.

Moreover, the drive coil 222 and vibration detection coil 252 are separately disposed, but one coil may serve both as the drive coil 222 and the vibration detection coil 252. For example, this can be realized by a changeover switch disposed to change between a case in which the coil is connected to the power source to serve as the drive coil and a case in which the coil is connected to a detection circuit to serve as the vibration detection coil. In this manner, the driving and the vibration detection are alternated with time. In this case, the constitution of the torsional rocking structural component is the same as that of the torsional rocking structural component of the first embodiment.

Moreover, the driving method is not limited to the reciprocating driving method by using an alternating current having a frequency equal to the resonance frequency. For example, the device may be statically positioned by driving it, for example, by a variable frequency or a direct current.

Modifications of the second embodiment will be described hereinafter with reference to the drawings. In the following description, the members equivalent to the aforementioned members are denoted with the same reference numerals, and a detailed description thereof is omitted.

Figure 33:
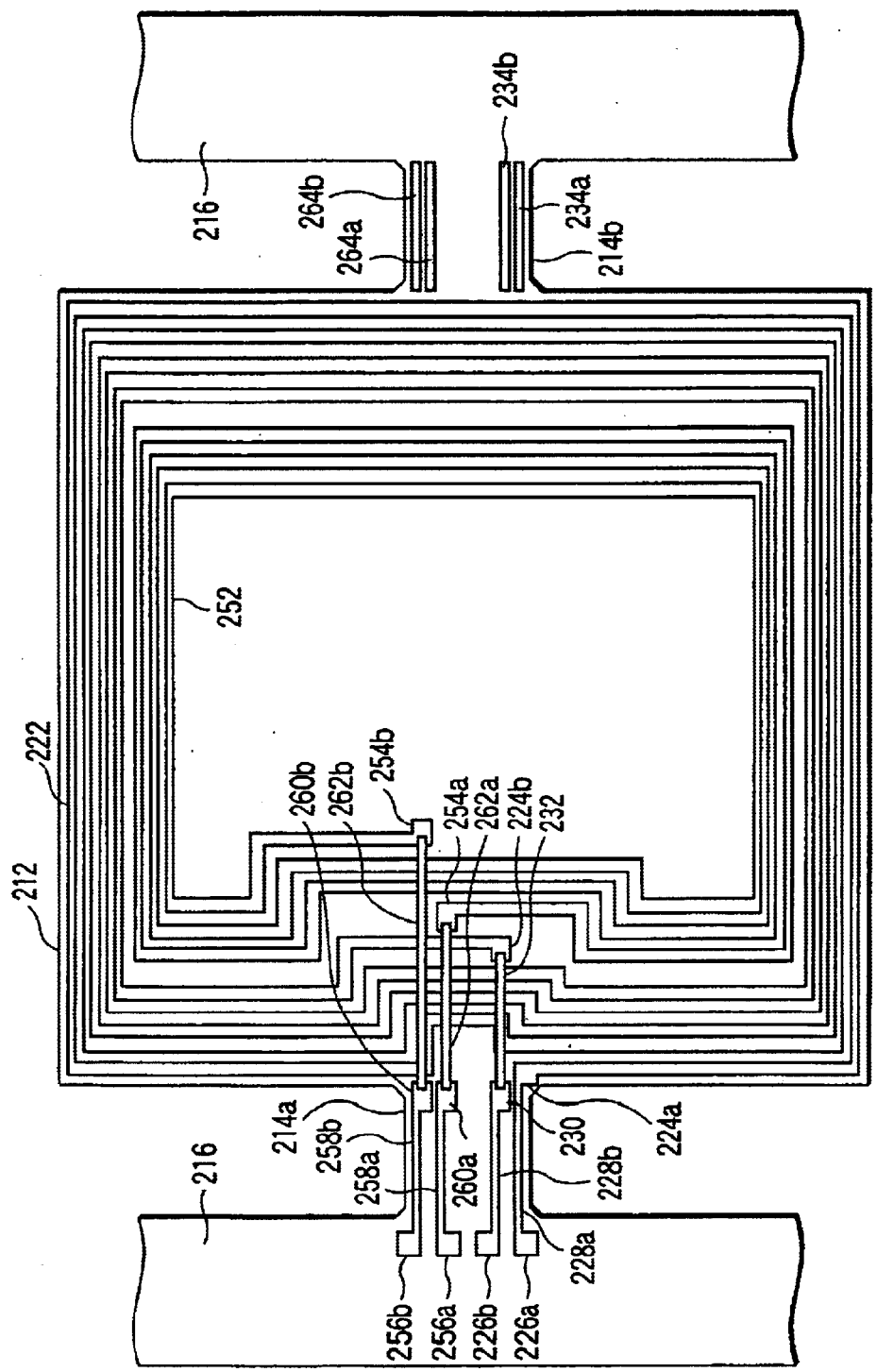
FIG. 33 is a partial plan view of the torsional rocking structural component according to a first modification of the torsional rocking structural component of the second embodiment.

In the torsional rocking structural component of a first modification, as shown in FIG. 33, the wirings 228a, 228b, 258a, 258b pass through the elastic member 214a. In further detail, the wirings 228a, 228b pass in the vicinity of one of the opposite edges of the elastic member 214a, and the wirings 258a, 258b pass in the vicinity of the other edge of the elastic member 214a. In other words, the wirings 228a, 228b, 258a, 258b extend, avoiding the vicinity of the geometric center of the surface of the elastic member 214a in which the Von Mises stress is highest. Therefore, there is little fear that the wirings 228a, 228b, 258a, 258b are disconnected by the torsional movement of the elastic member 214a. Additionally, the outer wiring 228a is different from the inner wiring 228b in the stress acting on the wiring. Similarly, the inner wiring 258a is different from the outer wiring 258b in the stress acting on the wiring. Therefore, attention must be paid in order to maintain reliability.

Moreover, the wirings 228a, 228b, and the wirings 258a, 258b are arranged symmetrically with respect to the rocking axis. Therefore, the elastic member 214a has torsion properties having a satisfactory symmetry with respect to the torsion direction.

The opposite-side elastic member 214b may be provided with dummy wirings 234a, 234b, 264a, 264b in order to enhance the symmetry of the torsion properties of the left and right elastic members 214a, 214b. The dummy wirings 234a, 234b, 264a, 264b are formed of the same material as that of the wirings 228a, 228b, 258a, 258b. Similarly as the wirings 228a, 228b, 258a, 258b, the dummy wirings 234a, 234b, 264a, 264b may pass in the vicinity of the opposite edges of the elastic member 214b.

Moreover, for the torsional rocking structural component of the first modification, since all of the four wirings 228a, 228b, 258a, 258b pass through the elastic member 214a, four electrode pads 226a, 226b, 256a, 256b are positioned in the vicinity. Therefore, the operation for connecting the wiring to the outside can be advantageously and easily performed.

As another modification of the torsional rocking structural component of the second embodiment, the elastic member 214b may be omitted, so that the movable plate 212 is supported only by the elastic member 214a in a cantilever manner.

Figure 34:
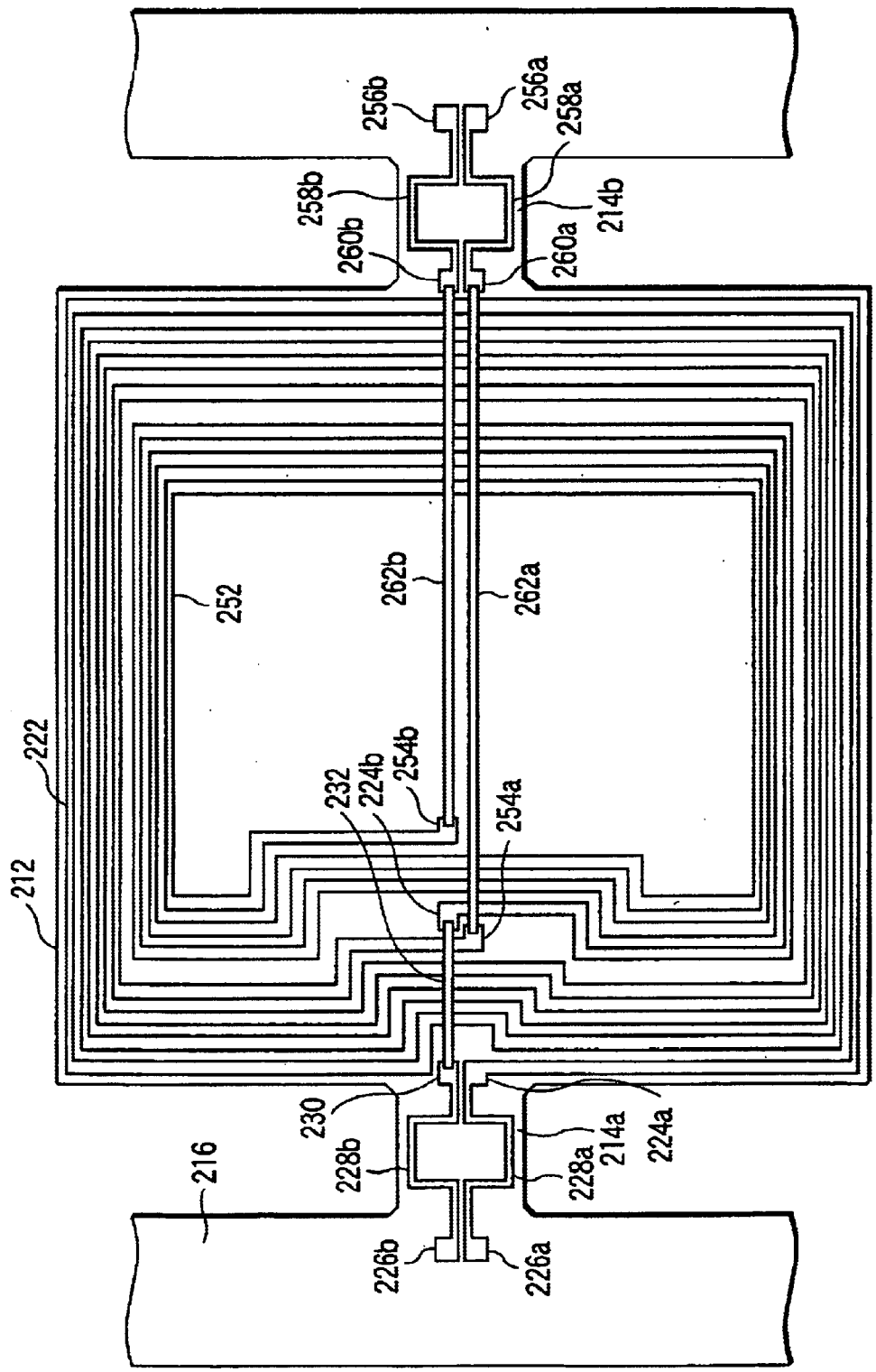
FIG. 34 is a partial plan view of the torsional rocking structural component according to a second modification of the torsional rocking structural component of the second embodiment.

In the torsional rocking structural component of a second modification, as shown in FIG. 34, the wirings 228a, 228b pass in the vicinity of the opposite edges of the elastic member 214a in the vicinity of the middle portion of the elastic member 214a along the rocking axis, and pass in the vicinity of the center of the elastic member 214a as for the transverse axis in the vicinity of the connection portions with the movable plate 212 and support 216. Similarly, the wirings 258a, 258b pass in the vicinity of the opposite edges of the elastic member 214b in the middle portion of the elastic member 214b, and pass in the vicinity of the center of the elastic member 214b as for the transverse axis in the vicinity of the connection portions with the movable plate 212 and support 216.

As described above, the Von Mises stress distribution has a highest value in the vicinity of the geometric center of the surface of the torsion spring 102, and has a relatively high value in the vicinity of the geometric corners of the surface of the torsion spring 102. Therefore, in other words, the wirings 228a, 228b, 258a, 258b extend, avoiding the vicinity of the geometric center of the surface of the elastic members 214a, 214b in which the Von Mises stress is highest because of the shear stress, and avoiding the vicinity of the geometric corners of the surface of the elastic members 214a, 214b in which the Von Mises stress is relatively high because of the tensile stress. Therefore, in the second modification, there is little fear that the wirings 228a, 228b, 258a, 258b are disconnected by the torsional movement of the elastic members 214a, 214b.

In any one of the aforementioned embodiments and modifications, the torsional rocking structural component with 1 degree of freedom has been illustrated, but the present invention may be applied to the torsional rocking structural component with 2 degrees of freedom such as the gimbal structure.

[Third Embodiment]

The torsional rocking structural component of a third embodiment of the present invention will be described. The torsional rocking structural component of the third embodiment is constituted by disposing a strain detection element for detecting the vibration of the movable plate 212 on the torsional rocking structural component of the first embodiment, instead of the vibration detection coil of the second embodiment. In the following description, the members equivalent to the members described above in the first embodiment are denoted with the same reference numerals, and a detailed description thereof is omitted.

Figure 35:
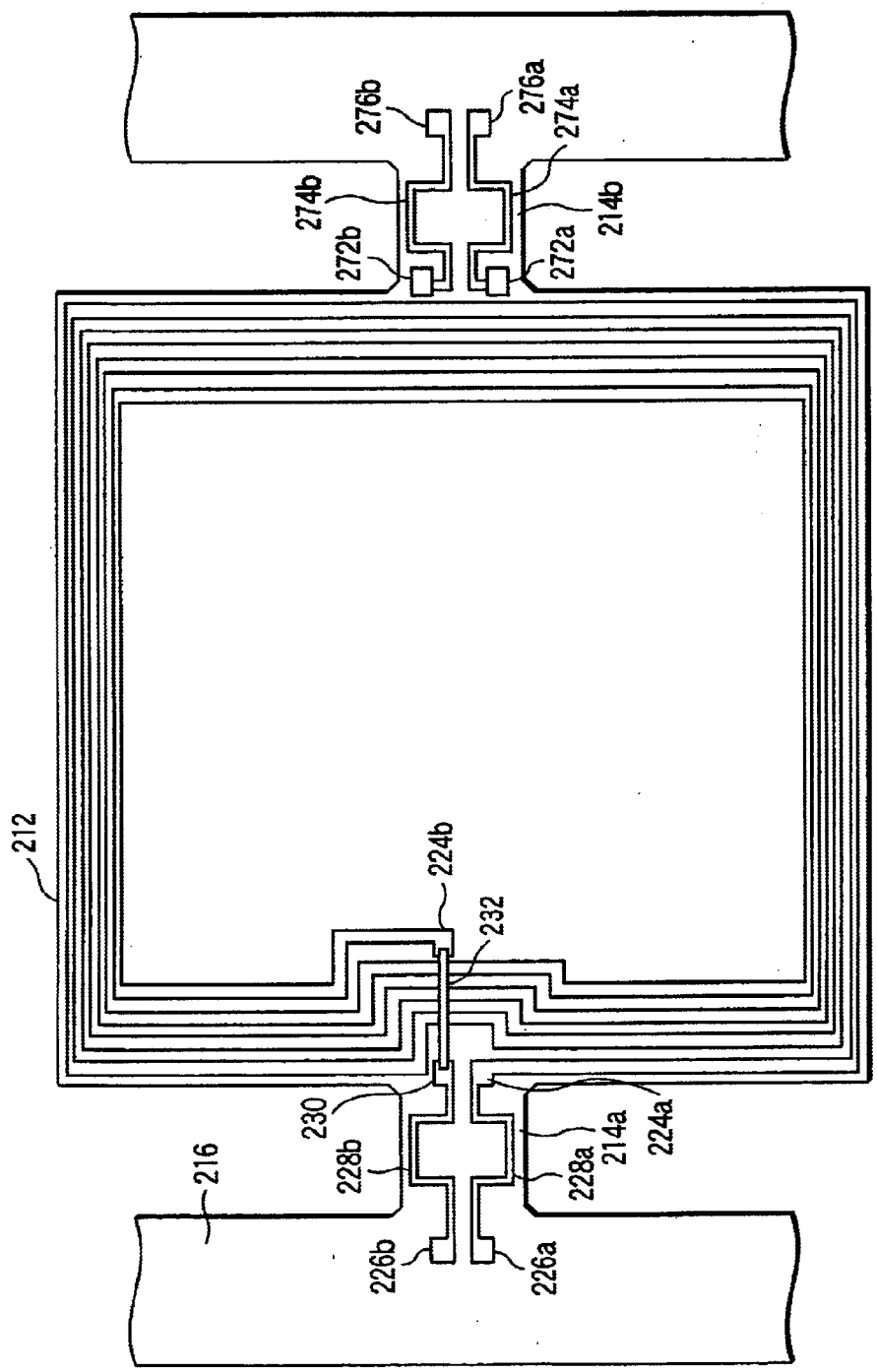
FIG. 35 is a partial plan view of the torsional rocking structural component according to a third embodiment of the present invention.
Figure 36:
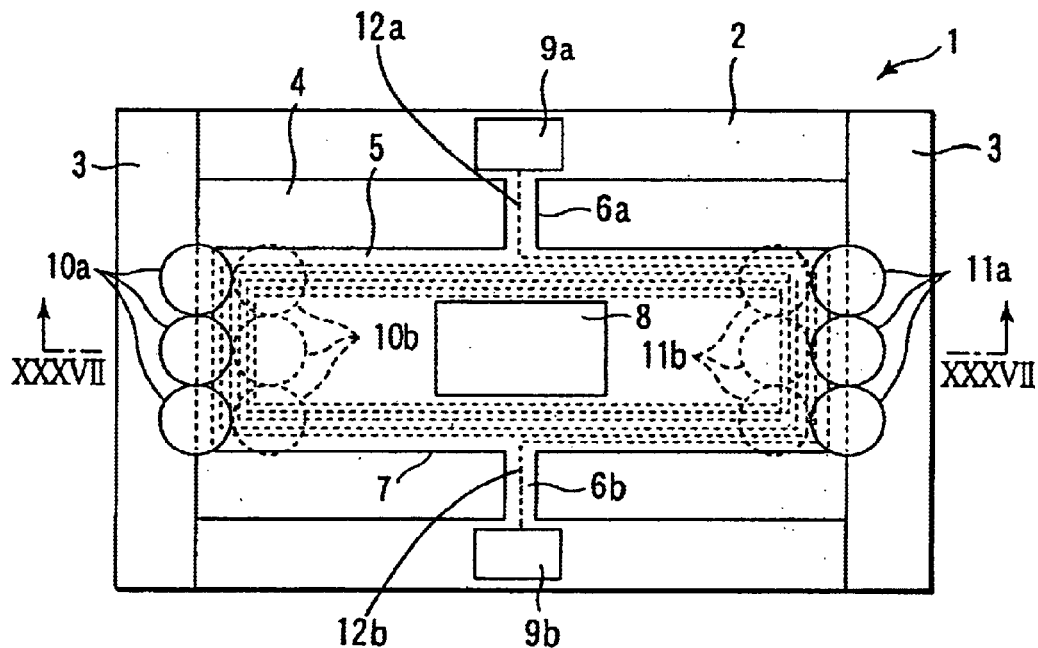
FIG. 36 is a plan view of an electromagnetic driving actuator using a conventional torsional rocking structural component.
Figure 37:
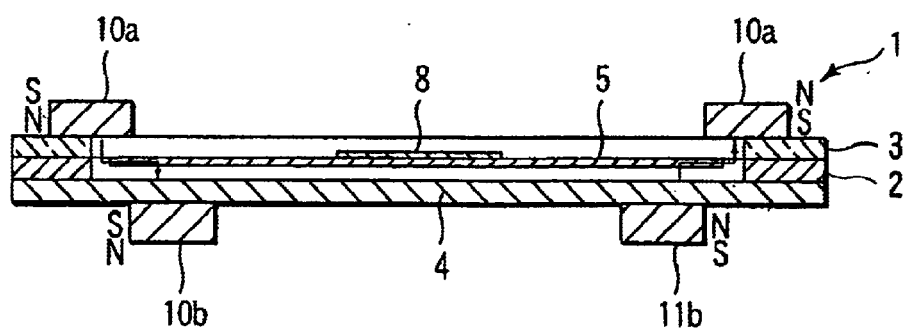
FIG. 37 is a sectional view of the actuator taken along line XXXVII—XXXVII of FIG. 36.

As shown in FIG. 35, the torsional rocking structural component of the third embodiment comprises the movable plate 212, the pair of elastic members 214a, 214b for rockably supporting the movable plate 212, the elastic members allowing the movable plate 212 to rock about a rocking axis extending inside of thereof, and the support 216 for holding the elastic members 214a, 214b. The movable plate 212 is provided with the drive coil 222 drawn around the peripheral edge of the plate.

The torsional rocking structural component 210 also comprises the wirings 228a, 228b passing through the elastic member 214a. One end of the wiring 228a is connected to the electrode pad 226a on the support, and the other end thereof is connected to the electrode pad 224a of the drive coil 222. One end of the wiring 228b is connected to the electrode pad 226b on the support, and the other end thereof is connected to the electrode pad 230. The electrode pad 230 is connected to the inner electrode pad 224b of the drive coil 222 via the jump wiring 232 extending across the drive coil 222 via the insulating layer.

The torsional rocking structural component 210 further comprises a pair of strain detection elements 272a, 272b. The strain detection elements 272a, 272b are disposed on the elastic member 214b. More particularly, the elements are disposed in the vicinity of the connection portion with the movable plate 212 and in the vicinity of the opposite edges of the elastic member 214b. That is, the strain detection elements 272a, 272b are disposed in the vicinity of the geometric corners of the surface of the elastic member 214b in which the Von Mises stress is relatively high because of the tensile stress.

The strain detection elements 272a, 272b are electrically connected to electrode pads 276a, 276b disposed on the support 216 via wirings 274a, 274b passing through the elastic member 214b.

The wirings 228a, 228b pass in the vicinity of the opposite edges of the elastic member 214a in the vicinity of the middle portion of the elastic member 214a along the rocking axis, and pass in the vicinity of the center of the elastic member 214a as for the transverse axis in the vicinity of the connection portions with the movable plate 212 and support 216. Similarly, the wirings 274a, 274b pass in the vicinity of the opposite edges of the elastic member 214b in the vicinity of the middle portion of the elastic member 214b, and pass in the vicinity of the center of the elastic member 214b as for the transverse axis in the vicinity of the connection portions with the movable plate 212 and support 216.

As described above, the Von Mises stress distribution has a highest value in the vicinity of the geometric center of the surface of the torsion spring 102, and has a relatively high value in the vicinity of the geometric corners of the surface of the torsion spring 102. Therefore, in other words, the wirings 228a, 228b, 274a, 274b extend, avoiding the vicinity of the geometric center of the surface of the elastic members 214a, 214b in which the Von Mises stress is highest because of the shear stress, and avoiding the vicinity of the geometric corners of the surface of the elastic members 214a, 214b in which the Von Mises stress is relatively high because of the tensile stress. Therefore, in the modification, there is little fear that the wirings 228a, 228b, 274a, 274b are disconnected by the torsional movement of the elastic members 214a, 214b.

Moreover, the wirings 228a, 228b, and wirings 274a, 274b are arranged symmetrically with respect to the elastic members 214a, 214b, respectively, and with respect to the rocking axis. Therefore, the elastic members 214a and 214b have torsion properties having the satisfactory symmetry with respect to the torsion direction.

The torsional rocking structural component of the third embodiment is manufactured by the manufacturing method similar to that of the torsional rocking structural component of the first embodiment. The third embodiment is the same as the first embodiment, except that the strain detection elements 272a, 272b are disposed and the wirings 274a, 274b and electrode pads 276a, 276b connected to the elements are formed simultaneously with the drive coil 222, and a detailed description of the third embodiment is omitted.

Similarly as the torsional rocking structural component of the first embodiment, the torsional rocking structural component of the third embodiment is applied to the electromagnetic driving actuator. The driving method of the actuator is the same as that of the actuator including the torsional rocking structural component of the first embodiment, and a detailed description thereof is omitted.

The actuator including the torsional rocking structural component of the third embodiment can monitor the vibration state of the movable plate 212 by the strain detection elements 272a, 272b. With the vibration of the movable plate 212, a strain is generated in the elastic members 214a, 214b. The strain detection elements 272a, 272b output a signal in accordance with the strain generated in the elastic member 214b. The polarity of the output signal of the strain detection elements 272a, 272b is determined by the torsion direction of movable plate 212, and a signal size is determined by the torsion angle of the movable plate 212.

In this manner, the output signals of the strain detection elements 272a, 272b reflect the vibration state of the movable plate 212. Therefore, the vibration state of the movable plate 212 can be monitored based on the signal. Moreover, the vibration of the movable plate 212 can also be controlled based on the signal. Concretely, the resonance frequency change and deflection angle change caused by the environmental change can be controlled and automatically corrected based on the output signals of the strain detection elements 272a, 272b.

In the conventional apparatus using the strain detection element, an optimum position in which the strain detection element is disposed is not taught. In the third embodiment, the optimum position in which the strain detection element is disposed is taught. That is, the strain detection elements 272a, 272b may be disposed in the vicinity of the opposite edges of the elastic member 214b in the vicinity of the connection portion with the movable plate 212. In other words, the element may be disposed in the vicinity of the geometric corners of the surface of the elastic member 214b. This is a position in which the Von Mises stress is relatively high because of the tensile stress. In the torsional rocking structural component of the third embodiment, since the strain detection elements 272a, 272b are disposed in the position having the high Von Mises stress, the vibration state of the movable plate 212 can be detected with a satisfactory sensitivity.

Similarly as the first embodiment, when the reflection mirror for reflecting the beam incident from the outside is disposed on the movable plate 212, the actuator can be used as the optical scanner for scanning the reflected beam. Moreover, the properties that enable the actuator to detect the deflection angle are utilized, and the actuator can also be used as a sensor for detecting angular speed and acceleration.

Moreover, since the torsional rocking structural component of the third embodiment is integrally formed utilizing the semiconductor manufacturing technique, the subsequent assembly operation is unnecessary, and a large amount of the microfine and inexpensive torsional rocking structural component can be produced. Additionally, the dimensional precision is very high, and variations in the properties of the material are very low.

The respective constitutions of the third embodiment are not limited to the aforementioned constitutions, and can be variously modified or changed.

For example, the drive coil 222 is formed by aluminum sputtering film formation and etching similarly as the first embodiment, but may be formed by plating. Particularly, when the aspect ratio of the drive coil 222 is enhanced by plating, the coil resistance is prevented from increasing, and an increase of the power voltage and power consumption is suppressed. In addition to these advantages, the occupied width of the drive coil 222 can be advantageously reduced. Therefore, the drive coil 222 can be disposed further in the vicinity of the peripheral edge of the movable plate 212, and a larger driving force can be obtained.

Moreover, the driving method is not limited to the reciprocating driving method by the alternating current having a frequency equal to the resonance frequency. For example, the constitution may statically be positioned by driving the constitution, for example, by a variable frequency or a direct current.

The strain detection elements 272a, 272b and wirings 274a, 274b may be disposed in the elastic member 214a. That is, the strain detection elements 272a, 272b are disposed in the vicinity of the opposite edges of the elastic member 214a in the vicinity of the connection portion with the movable plate 212, that is, in the vicinity of the geometric corners of the surface of the elastic member 214b in which the Von Mises stress is relatively high because of the tensile stress. The wirings 274a, 274b connected to the strain detection elements 272a, 272b may pass through the elastic member 214a outside the wirings 228a, 228b, and may be electrically connected to the electrode pads 276a, 276b disposed on the support 216 in the vicinity of the electrode pads 226a, 226b.

In this case, the wirings 228a, 272a and wirings 228b, 272b extend, avoiding the vicinity of the geometric center of the surface of the elastic member 214a in which the Von Mises stress is highest. Therefore, there is little fear that the wirings 228a, 228b, 272a, 272b are disconnected by the torsional movement of the elastic member 214a. Additionally, the outer wirings 274a, 274b are different from the inner wirings 228a, 228b in the stress acting on the wiring. Therefore, attention is necessary for securing the reliability.

Moreover, since the wirings 228a, 272a and wirings 228b, 272b are arranged symmetrically with respect to the rocking axis, the elastic member 214a has torsion properties with satisfactory symmetry with respect to the torsion direction. Furthermore, since four electrode pads 226a, 226b, 272a, 272b are positioned in the vicinity, the operation for connecting the wiring to the outside can easily be performed.

Furthermore, in order to enhance the symmetry of the torsion properties of the left and right elastic members 214a, 214b, for the opposite-side elastic member 214b, four corresponding dummy wirings may preferably be disposed on the wirings 228a, 228b, 272a, 272b.

As a further modification, the elastic member 214b may be omitted, and the movable plate 212 may be supported only by the elastic member 214a in a cantilever manner.

In any one of the aforementioned embodiments and modifications, the torsional rocking structural component with 1 degree of freedom has been illustrated, but the third embodiment may be applied to the torsional rocking structural component with 2 degrees of freedom such as the gimbal structure. Moreover, the present invention may be applied to the torsional rocking structural component for use in the electrostatic driving actuator.

Some embodiments have been concretely described above with reference to the drawings, but the present invention is not limited to the aforementioned embodiments, and includes all embodiments within the scope of the present invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A torsional rocking structural component comprising:
a movable plate;
first and second elastic members for rockably supporting the movable plate, each of the first and second elastic members having a rectangular parallelepiped shape and a rectangular surface;
a support for holding the first and second elastic members; and
wirings which extend through at least the first elastic member while avoiding a geometric center of the elastic member, the geometric center being in a middle portion of the rectangular surface alone a rocking axis and at a vicinity of the geometric center of the rectangular surface in which a transverse axis crosses at right angles to the rocking axis, and where a Von Mises stress generated during torsional deformation of the elastic member is relatively large, and the wirings further avoiding geometric corners of the elastic member, the geometric corners being at a vicinity of opposite ends of the rectangular surface along the rocking axis and at a vicinity of other opposite edges of the rectangular surface in which the transverse axis crosses at right angles to the rocking axis, and where the Von Mises stress generated during torsional deformation of the elastic member is relatively large, the wirings thereby passing through portions of the elastic member in which a stress generated during torsional deformation of the elastic member is small.

2. A torsional rocking structural component according to claim 1 wherein the wirings are located so that one of them is provided in each of the first and second elastic members.

3. A torsional rocking structural component according to claim 1 wherein the wirings are located so that an even number of them are provided in each of the first and second elastic members with the even number of wires arranged symmetrically with respect to the rocking axis.

4. A torsional rocking structural component according to claim 1 wherein the wirings are located on one of the first and second elastic members, and the torsional rocking structural component further comprises a strain detection element located on the other of the first and second elastic members and positioned at a portion in which a stress generated during torsional deformation of the other of the first and second elastic members is large.

5. A torsional rocking structural component according to claim 4 wherein the strain detection element is located at one of the geometric corners of the surface of the other of the first and second elastic members.

6. A torsional rocking structural component according to claim 1, wherein the wirings pass by edges of each of the opposite ends of the elastic member in the middle portion of the elastic member along the rocking axis, pass by the center of the elastic member along the transverse axis near a portion connecting the elastic member with the movable plate, and pass by the center of the elastic member along the transverse axis near a portion connecting the elastic member with the support.

7. A torsional rocking structural component comprising:
a movable plate;
an elastic member for rockably supporting the movable plate, the elastic member having a rectangular parallelepiped shape and a rectangular surface;
a support for holding the elastic member; and
a wiring, which extends through the elastic member while avoiding a geometric center of the elastic member, the geometric center being in a middle portion of the rectangular surface along a rocking axis and at a vicinity of the geometric center of the rectangular surface in which a transverse axis crosses at right angles to the rocking axis, and where a Von Mises stress generated during torsional deformation of the elastic member is relatively large, and the wiring further avoiding geometric corners of the elastic member, the geometric corners being at a vicinity of opposite ends of the rectangular surface along the rocking axis and at a vicinity of other opposite edges of the rectangular surface in which the transverse axis crosses at right angles to the rocking axis, and where the Von Mises stress generated during torsional deformation of the elastic member is relatively large, the wiring thereby passing through portions of the elastic member in which a stress generated during torsional deformation of the elastic member is small.

8. A torsional rocking structural component comprising:
a movable plate;
an elastic member for rockably supporting the movable plate, the elastic member having a rectangular parallelepiped shape and a rectangular surface;
a support for holding the elastic member; and
two wirings, each of which extends through the elastic member while avoiding a geometric center of the elastic member, the geometric center being in a middle portion of the rectangular surface along a rocking axis and at a vicinity of the geometric center of the rectangular surface in which a transverse axis crosses at right angles to the rocking axis, and where a Von Mises stress generated during torsional deformation of the elastic member is relatively large, and the wirings further avoiding geometric corners of the elastic member, the geometric corners being at a vicinity of opposite ends of the rectangular surface along the rocking axis and at a vicinity of other opposite edges of the rectangular surface in which the transverse axis crosses at right angles to the rocking axis, and where the Von Mises stress generated during torsional deformation of the elastic member is relatively large, the wirings thereby passing through portions of the elastic member in which a stress generated during torsional deformation of the elastic member is small.

9. A torsional rocking structural component comprising:
a movable plate;
an elastic member for rockably supporting the movable plate, the elastic member having a rectangular parallelepiped shape and a rectangular surface;
a support for holding the elastic member; and
an even number of wirings, all of which extend through the elastic member while avoiding a geometric center of the elastic member, the geometric center being in a middle portion of the rectangular surface alone a rocking axis and at a vicinity of the geometric center of the rectangular surface in which a transverse axis crosses at right angles to the rocking axis, and where a Von Mises stress generated during torsional deformation of the elastic member is relatively large, and the wirings further avoiding geometric corners of the elastic member, the geometric corners being at a vicinity of opposite ends of the rectangular surface along the rocking axis and at a vicinity of other opposite edges of the rectangular surface in which the transverse axis crosses at right angles to the rocking axis, and where the Von Mises stress generated during torsional deformation of the elastic member is relatively large, the wirings thereby passing through portions of the elastic member in which a stress generated during torsional deformation of the elastic member is small.

10. A torsional rocking structural component according to claim 7, wherein the wiring passes by edges of each of the opposite ends of the elastic member in the middle portion of the elastic member along the rocking axis, passes by a center of the elastic member along the transverse axis near a portion connecting the elastic member with the movable plate, and passes by a center of the elastic member along the transverse axis near a portion connecting the elastic member with the support.

11. A torsional rocking structural component according to claim 8, wherein the wirings pass by edges of each of the opposite ends of the elastic member in the middle portion of the elastic member along the rocking axis, pass by the center of the elastic member along the transverse axis near a portion connecting the elastic member with the movable plate, and pass by the center of the elastic member along the transverse axis near a portion connecting the elastic member with the support.

12. A torsional rocking structural component according to claim 9, wherein the wirings pass by edges of each of the opposite ends of the elastic member in the middle portion of the elastic member along the rocking axis, pass by the center of the elastic member along the transverse axis near a portion connecting the elastic member with the movable plate, and pass by the center of the elastic member along the transverse axis near a portion connecting the elastic member with the support.

* * * * *